(12) United States Patent
Nunome et al.

(10) Patent No.: US 8,378,055 B2
(45) Date of Patent: Feb. 19, 2013

(54) POLYESTER CARBONATE COPOLYMER FOR OPTICAL LENS AND OPTICAL LENS

(75) Inventors: Kazunori Nunome, Chiyoda-ku (JP);
Manabu Matsui, Chiyoda-ku (JP);
Kazushi Tando, Chiyoda-ku (JP);
Teruyuki Shigematsu, Chiyoda-ku (JP);
Tetsuya Motoyoshi, Chiyoda-ku (JP);
Tomokiyo Doi, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 13/386,472

(22) PCT Filed: Jul. 16, 2010

(86) PCT No.: PCT/JP2010/062481
§ 371 (c)(1),
(2), (4) Date: Jan. 23, 2012

(87) PCT Pub. No.: WO2011/010741
PCT Pub. Date: Jan. 27, 2011

(65) Prior Publication Data
US 2012/0123083 A1    May 17, 2012

(30) Foreign Application Priority Data

Jul. 24, 2009  (JP) .................................. 2009-173250
Oct. 26, 2009  (JP) .................................. 2009-245527
Dec. 15, 2009  (JP) .................................. 2009-284088
Mar. 18, 2010  (JP) .................................. 2010-062439

(51) Int. Cl.
*C08G 64/00* (2006.01)
*C08G 63/02* (2006.01)

(52) U.S. Cl. ............ 528/196; 524/95; 524/96; 528/176; 528/198

(58) Field of Classification Search .................. 524/95, 524/96; 528/176, 196, 198
See application file for complete search history.

(56) References Cited

FOREIGN PATENT DOCUMENTS

| JP | 6-145317 | 5/1994 |
| JP | 6-305044 | 11/1994 |
| JP | 8-54615 | 2/1996 |
| JP | 10-87800 | 4/1998 |
| JP | 2002-309015 | 10/2002 |
| JP | 2005-232252 | 9/2005 |

OTHER PUBLICATIONS

International Search Report issued Oct. 19, 2010 in International (PCT) Application No. PCT/JP2010/062481, of which the present application is the national stage.
International Preliminary Report on Patentability and Written Opinion issued Feb. 7, 2012 in International (PCT) Application No. PCT/JP2010/062481, of which the present application is the national stage.

*Primary Examiner* — Terressa Boykin
(74) *Attorney, Agent, or Firm* — Wenderoth, Lind & Ponack, L.L.P.

(57) ABSTRACT

This invention is to provide a polyester carbonate copolymer suitable for an optical lens that has high refractivity and transparency and low birefringence and little optical strain, and optical lenses formed therefrom.

This invention is a polyester carbonate copolymer for an optical lens, which comprises 67 to 95 mol % of a unit of the following formula (I) and 33 to 5 mol % of a unit of the following formula (II) and has a specific viscosity of 0.12 to 0.30,

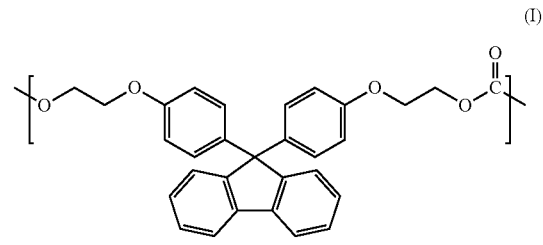

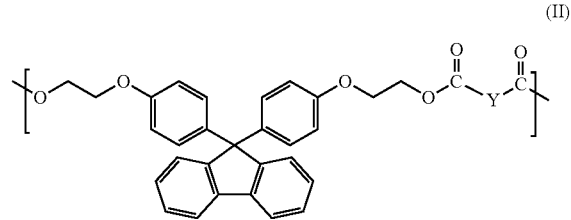

wherein Y in the formula (II) is a phenylene group or a naphthalenediyl group.

11 Claims, 4 Drawing Sheets

POLYESTER CARBONATE COPOLYMER FOR OPTICAL LENS AND OPTICAL LENS

TECHNICAL FIELD

This invention relates to a polyester carbonate copolymer and an optical lens formed thereof. More specifically, it relates to a polyester carbonate copolymer having high refractivity and transparency and having low birefringence and an optical lens formed thereof.

BACKGROUND ART

As a material for optical lenses for use in optical systems of various cameras such as a camera with a film integrated and a video camera, an optical glass or an optical resin is used. The optical glass is excellent in heat resistance, transparency, dimensional stability and chemical resistance, while it has problems of a high material cost, poor moldability and low productivity.

An optical lens formed of the optical resin has an advantage that can be mass-produced by injection molding. For camera lenses, a polycarbonate resin, etc., are used. In recent years, however, there is demand for developing high-refractivity resins, owing to requirements for products to be lighter in weight and more compact in size. Generally, when an optical material has a high refractive index, a lense element having the same refractive index can be materialized with a surface having a smaller curvature, so that the amount of aberration which occurs on the surface can be decreased, that the number of lenses can be decreased, that the eccentric sensitivity can be decreased and that the thickness of a lens can be decreased to render the element lighter.

Further, when the optical resin is used for an optical lens, it is required to have heat resistance, transparency, low water absorption, chemical resistance, light resistance, low birefringence and wet heat resistance in addition to refractivity and Abbe's number. The consequent disadvantage is that the place of use is limited depending upon a balance among properties of a resin. In particular, with an increase in resolution owing to an improvement in the number of pixels in recent years, there is demanded a lens having high imaging performances and lower birefringence. As a method for decreasing the birefringence, generally, there is employed a method in which offsetting birefringences by using a material having positive birefringence and a material having negative birefringence. Therefore, an amount ratio of the material having positive birefringence to material having negative birefringence is very important. For taking a picture of a clear image, the lens is required to maintain high transmittance in all the wavelengths of the visible light region.

There has been therefore developed those resins for an optical lens which have high refractivity, low birefringence and an excellent balance among physical properties. For example, there has been proposed a polyester comprising a fluorene-containing dihydroxy compound and naphthalene-dicarboxylic acid (Patent Document 1). However, although the above polyester has high refractivity, it has high birefringence since the positive and negative birefringences are not offset each other. Further, since it has a large content of naphthalene, an absorption derived from a naphthalene ring appears at 380 to 400 nm, and the transmittance thereof to visible light is sometimes greatly decreased.

There is also proposed a polyester carbonate comprising 9,9-bis[4-(2-hydroxyethoxy)phenyl]fluorene and an aromatic dicarboxylic acid (Patent Documents 2 and 3). However, the above proposal fails to define the aromatic dicarboxylic acid in range or type, and the refractive index is insufficient depending upon aromatic dicarboxylic acids used. Further, since nothing has been studied with regard to the birefringence and transmittance to visible light, the birefringence becomes large depending upon a compositional ratio of the 9,9-bis[4-(2-hydroxyethoxy)phenyl]fluorene to aromatic dicarboxylic acid, and the transmittance to visible light is sometimes decreased.

Further, optical lenses are used for various purposes, while they are different in form and size depending upon such purposes. For example, the camera lens for a cellphone is very compact and thin like φ5 mm and a thickness of about 0.3 mm, and it is getting more compact and thinner in recent years. When such a compact and thin lens is produced by injection molding, if the flowability of a resin is insufficient, there are some cases where lenses having an intended form cannot be obtained. Since the flowability of a resin is determined by its molecular weight, molecular structure and copolymer composition, the flowability of a resin having such a molecular weight and a copolymer composition as those in Patent Documents 2 and 3 is insufficient, and it is difficult to use such a resin for a compact and thin optical lens.

Further, when a polyester carbonate is produced, it is very important to control the reduced pressure degree. When a polyester carbonate is produced, two monohydroxy compounds having different boiling points are by-produced unlike a polyester or polycarbonate, so that it is very important to control the speed of distilling the by-products off on the basis of the reduced pressure degree during the production. The production method described in Patent Documents 2 and 3 carry out no pressure reduction at an initial stage of a reaction, so that a phenol is not distilled off, and there is a problem that the reaction time period is very long.

(Patent Document 1) JP2006-335974A
(Patent Document 2) JP10-87800A
(Patent Document 3) JP2002-309015A

DISCLOSURE OF THE INVENTION

It is therefore an object of this invention to provide a polyester carbonate copolymer suitable for a compact and thin optical lens having high refractivity and transparency and having low birefringence and fewer optical strain, and an optical lens formed from it.

For achieving the above object, the present inventors have made diligent studies. As a result, it has been found that the above object can be achieved by copolymerizing 9,9-bis[4-(2-hydroxyethoxy)phenyl]fluorene and a dicarboxylic acid or an ester-forming derivative thereof in a specific amount ratio, and this invention has been accordingly made.

That is, this invention is a polyester carbonate copolymer for an optical lens, which comprises 67 to 95 mol % of a unit of the following formula (I) and 33 to 5 mol % of a unit of the following formula (II) and has a specific viscosity of 0.12 to 0.30.

(I)

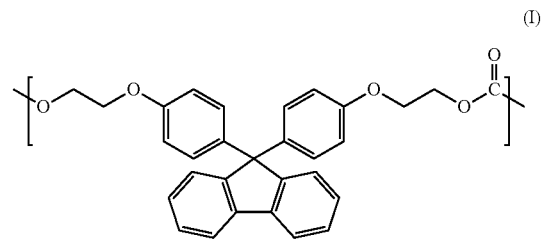

-continued

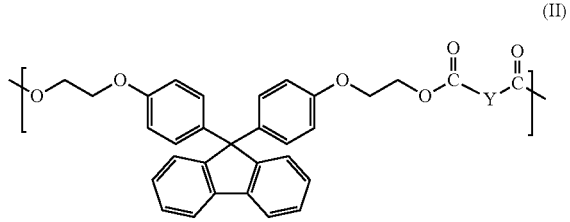
(II)

wherein Y in the formula (II) is a phenylene group or a naphthalenediyl group.

Further, this invention includes a process for producing a polyester carbonate copolymer for the above optical lens, which comprises the steps of (i) melting 9,9-bis[4-(2-hydroxyethoxy)phenyl]fluorene, an aromatic dicarboxylic acid or an ester-forming derivative thereof and a carbonate diester in a first reaction vessel (step 1), (ii) reacting them each other in the first reaction vessel at a temperature of 120 to 300° C. under a reduced pressure of 20 to 90 kPa until the distillation amount of by-produced monohydroxy compounds reaches 50 to 90% of a theoretical distillation amount (step 2), (iii) transferring a reaction solution from the first reaction vessel to the second reaction vessel (step 3), and (iv) proceeding with the reaction in the second reaction vessel at a temperature of 150 to 320° C. until a final internal pressure comes to be 1 to 500 Pa (step 4).

BEST MODE FOR CARRYING OUT THE INVENTION

Polyester Carbonate Copolymer

Figure 1:
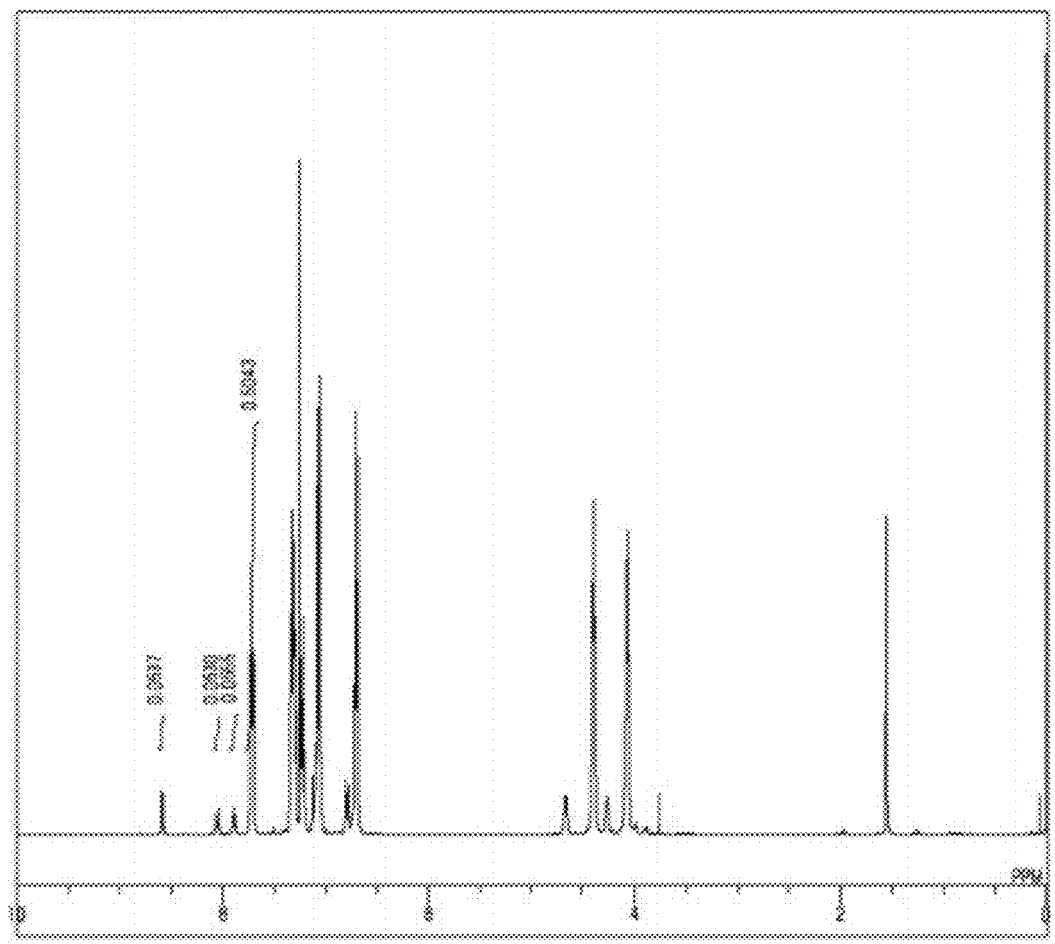
FIG. 1 is the proton NMR of a polyester carbonate copolymer obtained in Example 1.

The polyester carbonate copolymer (to be sometimes referred to as "copolymer" hereinafter) of this invention comprises a carbonate unit of the following formula (I). The content of the unit of the formula (I) is 67 to 95 mol %, preferably 70 to 95 mol %.

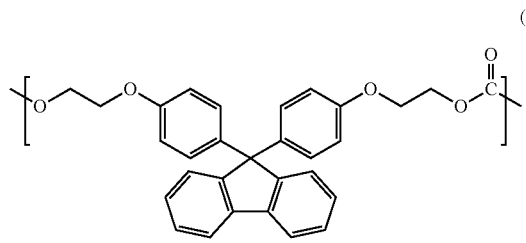
(I)

The copolymer of this invention comprises an ester unit of the following formula (II). The content of the unit of the formula (II) is 33 to 5 mol %, preferably 30 to 5 mol %.

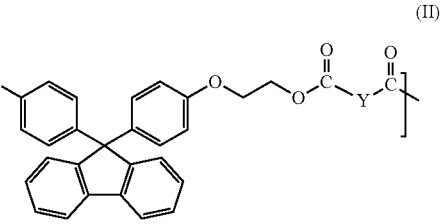
(II)

In the formula (II), Y is a phenylene group or a naphthalenediyl group. Y is preferably a 1,4-phenylene group, 1,3-phenylene group or 2,6-naphthalenediyl group.

When Y in the formula (II) is a 2,6-naphthalenediyl group, preferably, the content of the unit of the formula (I) is 82 to 95 mol %, and the content of the unit of the formula (II) is 18 to 5 mol %.

When Y in the formula (II) is a 1,4-phenylene group or 1,3-phenylene group, the content of the unit of the formula (I) is preferably 67 to 89 mol %, more preferably 75 to 82 mol %, and the content of the unit of the formula (II) is preferably 33 to 11 mol %, more preferably 25 to 18 mol %.

The specific viscosity of the copolymer of this invention is in the range of 0.12 to 0.30, preferably 0.15 to 0.25, more preferably 0.18 to 0.23. The specific viscosity is obtained by dissolving 0.7 g of the copolymer in 100 ml of methylene chloride and measuring the solution at 20° C. When the specific viscosity is less than 0.12, a molded product is fragile. When it is higher than 0.30, the melt-viscosity and solution viscosity are high, which results in a difficulty in handling.

The refractive index of the copolymer of this invention is preferably in the range of 1.635 to 1.650, more preferably 1.636 to 1.650, still more preferably 1.637 to 1.650. The refractive index is measured at 25° C. using a wavelength of 589 nm.

The Abbe's number (ν) of the copolymer of this invention is preferably in the range of 20 to 27, more preferably 21 to 27, still more preferably 21 to 25. The Abbe's number (ν) is calculated on the basis of the following expression using refractive indexes at wavelengths of 486 nm, 589 nm and 656 nm.

$$\nu = (nD-1)/(nF-nC)$$

nD: Refractive index at a wavelength of 589 nm
nF: Refractive index at a wavelength of 656 nm
nC: Refractive index at a wavelength of 486 nm The orientation birefringence (Δn) of the copolymer of this invention is preferably in the range of 0 to $6 \times 10^{-3}$, more preferably 0 to $4 \times 10^{-3}$, still more preferably 0 to $1 \times 10^{-3}$. The orientation birefringence (Δn) is measured at a wavelength of 589 nm when a 100 μm thick cast film obtained from the above copolymer is stretched twice at Tg+10° C.

The spectral transmittance of the copolymer of this invention is preferably 80% or more, more preferably 81% or more, still more preferably 82% or more. For the transmittance, a 0.1 mm thick molded plate is measured at a wavelength of 395 nm.

The glass transition temperature (Tg) of the copolymer of this invention is preferably 130 to 160° C., more preferably 135 to 155° C., still more preferably 140 to 155° C. The glass transition temperature (Tg) is measured at a temperature elevation rate of 20° C./minute. When Tg is lower than 130° C., an optical part obtained by molding the above copolymer has insufficient heat resistance depending upon fields of use.

When Tg is higher than 160° C., the melt viscosity becomes high, and the handling for obtaining a molded product is difficult.

In the copolymer of this invention, the 5% weight loss temperature measured at a temperature elevation rate of 20° C./minute as an index for thermal stability is preferably 350° C. or higher, more preferably 380° C. or higher. When the 5% weight loss temperature is lower than 350° C., undesirably, the copolymer undergoes severe thermal decomposition during its molding, and it is difficult to obtain good molded products.

The melt viscosity of the copolymer of this invention at 280° C. at a shear rate of 1,000/second is preferably 30 to 300 Pa·s, more preferably 30 to 200 Pa·s, still more preferably 50 to 160 Pa·s.

The phenol content of the copolymer of this invention is preferably 1 to 100 ppm, more preferably 1 to 50 ppm, still more preferably 1 to 10 ppm.

<Process for Producing Copolymer>

The copolymer of this invention can be produced by reacting a diol component, a dicarboxylic component and a carbonate precursor.

(Diol Component)

The diol component is mainly 9,9-bis[4-(2-hydroxyethoxy)phenyl]fluorene (to be sometimes abbreviated as "BPES" hereinafter) of the following formula (a).

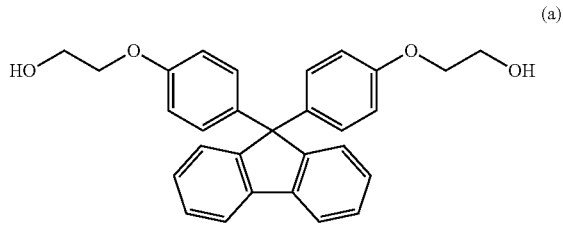 [SMILES: OCCOc1ccc(C2(c3ccc(OCCO)cc3)c3ccccc3-c3ccccc32)cc1]

(a)

The content of BPEF in the diol component is preferably 80 mol % or more, more preferably 90 mol % or more, still more preferably 95 mol % or more.

Other diol component includes aliphatic diols such as ethylene glycol, propanediol, butanediol, pentanediol and hexanediol, alicyclic diols such as tricyclo[5.2.1.0$^{2,6}$]decanedimethanol, cyclohexane-1,4-dimethanol, decalin-2,6-dimethanol, norbornanedimethanol, pentacyclopentadecanedimethanol, cyclopentane-1,3-dimethanol and spiroglycol, and aromatic diols such as bisphenol A.

(Dicarboxylic Acid Component)

The dicarboxylic acid component is mainly terephthalic acid, isophthalic acid, 2,6-naphthalenedicarboxylic acid or an ester-forming derivative of any one of these.

The dicarboxylic acid component may contain other dicarboxylic acid component so long as the properties of a copolymer to be obtained are not impaired. In this case, the content of terephthalic acid, isophthalic acid or 2,6-naphthalenedicarboxylic acid per 100 mol % of the dicarboxylic acid component is preferably 80 mol % or more, more preferably 90 mol % or more, still more preferably 95 mol % or more.

Other dicarboxylic acid component includes aliphatic dicarboxylic acids such as malonic acid, succinic acid, glutaric acid, adipic acid, pimelic acid, suberic acid, azelaic acid, methylmalonic acid and ethylmalonic acid. Further, it includes monocyclic aromatic dicarboxylic acids such as phthalic acid, and polycyclic aromatic dicarboxylic acids such as 2,7-naphthalenedicarboxylic acid, 2,3-naphthalenedicarboxylic acid, 1,4-naphthalenedicarboxylic acid, 1,8-naphthalenedicarboxylic acid, anthracenedicarboxylic acid and phenanthrenedicarboxylic acid. Further, it includes biphenyldicarboxylic acids such as 2,2'-biphenyldicarboxylic acid and alicyclic dicarboxylic acids such as 1,4-cyclodicarboxylic acid and 2,6-decalindicarboxylic acid. These may be used singly or in combination of two or more of these. As derivatives of these, further, acid chlorides or esters are used.

The molar ratio of the 9,9-bis[4-(2-hydroxyethoxy)phenyl]fluorene component to the dicarboxylic acid component is preferably from 75:25 to 95:5. When the amount ratio of the 9,9-bis[4-(2-hydroxyethoxy)phenyl]fluorene component is too large, undesirably, the negative birefringence of an optical lens formed from the copolymer becomes large, and the refractive index becomes low. When the amount ratio of the dicarboxylic acid component is too large, undesirably, the positive birefringence of an optical lens formed from the copolymer becomes large. Further, since the amount of the dicarboxylic component is large, the transmittance to visible light is decreased.

When the dicarboxylic acid component is a 2,6-naphthalenedicarbxoylci acid component, the molar ratio of the 9,9-bis[4-(2-hydroxyethoxy)phenyl]fluorene component to the dicarboxylic acid component is preferably in the range of from 85:15 to 95:5, since the birefringence of an optical lens formed from the copolymer in particular becomes small.

Further, when the dicarboxylic acid component is terephthalic acid or isophthalic acid, the molar ratio of the 9,9-bis[4-(2-hydroxyethoxy)phenyl]fluorene component to the dicarboxylic acid component is preferably in the range of from 80:20 to 85:15, since the birefringence of an optical lens formed from the copolymer in particular becomes small.

(Carbonate Precursor)

The carbonate precursor includes phosgene, bischloroformate of 9,9-bis[4-(2-hydroxyethoxy)phenyl]fluorene, and carbonate diesters such as diphenyl carbonate, di-p-tolyl carbonate, phenyl-p-tolyl carbonate, di-p-chlorophenyl carbonate and dinaphthyl carbonate. Of these, diphenyl carbonate is preferred.

(Ester-Exchange Method)

The copolymer of this invention can be produced by subjecting the diol component, the dicarboxylic acid component and the carbonate diester to ester-exchange (ester-exchange method).

In the ester-exchange, preferably, the diol component, the dicarboxylic acid component or a diester thereof and bisaryl carbonate are mixed in the presence of an inert gas, and react the mixture under reduced pressure, generally at 120 to 350° C., preferably at 150 to 300° C. The reduced pressure degree is stepwise changed, and finally adjusted to 1 mmHg or less to distill off generated alcohols from the reaction system. The reaction time period is normally approximately 1 to 4 hours. The ester-exchange method is preferably carried out according to the following steps 1 to 4.

(Step 1)

The step 1 is a step in which 9,9-bis[4-(2-hydroxyethoxy)phenyl]fluorene (BPEF), aromatic dicarboxylic acid or an ester-forming derivative thereof and carbonate diester are melted in the first reaction vessel. The aromatic dicarboxylic acid is terephthalic acid, isophthalic acid, naphthalenedicarboxylic acid or an ester-forming derivative of any one of these. The carbonate diester is preferably diphenyl carbonate.

As the first reaction vessel, it is preferred to use a vertical stirring vessel having a rectifying column for separating unreacted carbonate diester and monomer from by-produced monohydroxy compounds and refluxing the unreacted carbonate diester and monomer to the reaction system. In the first reaction vessel, predetermined amounts of monomers are charged, an atmosphere therein is replaced with nitrogen, and then BPEF, aromatic dicarboxylic acid and carbonate diester are mixed and melted in the presence of an inert gas.
(Step 2)

The step 2 is a step in which the melted mixture react at a temperature of 120 to 300° C. under a reduced pressure of 20 to 90 kPa until the distillation amount of by-produced monohydroxy compounds reaches 50 to 90% of a theoretical distillation amount.

After melted, they are allowed to react at 20 to 90 kPa, preferably under a weak reduced pressure of 40 to 80 kPa at 120 to 300° C., preferably at 150 to 280° C., more preferably at 180 to 280° C., and by-produced monohydroxy compounds are distilled off from the system. When one monohydroxy compound is by-produced like the production of a polyester or polycarbonate, it is not required to rigorously control the reduced pressure degree. However, when two or more monohydroxy compounds are by-produced like the production of the present polyester carbonate, the reduced pressure degree is very important for controlling the reaction speed. When the reaction is carried out under atmospheric pressure, undesirably, a melted product is oxidized, or the amount of a residual phenol after the end of the reaction increases to degrade the color hue. Further, undesirably, the speed of distilling off a phenol is decreased, and the reaction between BPEF and diphenyl carbonate takes a longer time. When the reduced pressure degree is smaller than 20 kPa, undesirably, unreacted carbonate diester and monomer are sometimes distilled off. Undesirably, further, the speed of distilling off a phenol is increased, the reaction between BPEF and diphenyl carbonate predominantly takes place, and the reaction between BPEF and dicarboxylic acid does not proceed.

The reaction is preferably carried out until the distillation amount of by-produced monohydroxy compounds reaches 50 to 90%, preferably 60 to 80%, of a theoretical value. When the distillation amount is smaller than 50%, undesirably, much unreacted carbonate diester and monomer remain, and a molar balance among raw materials may be sometimes broken in the second reaction vessel. When the distillation amount is greater than 90%, undesirably, the viscosity of a resin becomes high, and it takes a long period of time to transfer a reaction solution from the first reaction vessel to the second reaction vessel.

The above monohydroxy compounds include a phenol by-produced in a reaction between BPEF and carbonate diester, alkyl alchohols such as methanol by-produced in a reaction between BPEF and aromatic dicarboxylic acid and water. The theoretical distillation amount (A) of the monohydroxy compounds refers to a volume of monohydroxy compounds that are distilled off when all of charged BPEF, aromatic dicarboxylic acid and carbonate diester is completely reacted.

The stirring speed of the stirrer for use in the first reaction vessel is preferably a relatively high-rate stirring speed, for example, several tens to 200 rpm, since the viscosity of a reaction mixture is low and the evaporation of generated monohydroxy compounds requires large energy.
(Step 3)

The step 3 is a step in which the reaction solution is transferred from the first reaction vessel to the second reaction vessel. In the process of this invention, the viscosity of the reaction system greatly changes as the ester exchange reaction proceeds, and the amount of the monohydroxy compounds by-produced in the reaction greatly changes, so that it is preferred to use the first reaction vessel and the second reaction vessel. When the reaction solution is transferred from the first reaction vessel to the second reaction vessel, the reaction solution can be filtered between the first reaction vessel and the second reaction vessel for removing foreign matter. As the above filter, a filter having apertures of 10 μm or less is generally used.
(Step 4)

The step 4 is a step in which the reaction is continued at a temperature of 150 to 320° C. under reduced pressure until a final internal pressure comes to be 1 to 500 Pa. The step 4 is carried out in the second reaction vessel.

As the second reaction vessel, a vertical or horizontal stirring vessel is used. The reaction pressure frequently becomes a high vacuum degree, and there is not much unreacted carbonate diester that affects the molar balance of raw materials, so that usually no rectifying column is provided and volatilized products are taken out of the system as they are. As a stirring blade for use in the second reaction vessel, it is preferred to use a blade that is excellent in ability to renew the surface of a reaction mixture and capability to crush up generated gas bubbles, such as a helical ribbon blade or anchor blade that exhibits excellent performances in a high viscosity. In the second reaction vessel, the resin is charged, and then the condensing reaction is carried out while distilling off generated monohydroxy compounds by changing stepwise the reduced pressure degree at 150 to 320° C., preferably 180 to 300° C., more preferably 200 to 280° C. and finally reducing the pressure to 1 to 500 Pa.

The stirring speed of the stirrer for use in the second reaction vessel is preferably a lower stirring speed than that in the first reaction vessel, for example, several to several tens rpm since the viscosity of the reaction mixture is high.

The polyester carbonate polymer generated in the second reaction vessel is taken out from the second reaction vessel as a sheet or strands by exerting a pressure inside the second reaction vessel, and the sheet or strands are cooled with water, etc., to prepare a commercial product by pelletizing it. In addition, during the reaction in the second reaction vessel, or before or during the exertion of a pressure after the end of the reaction, various additives such as a deactivator, an antioxidant, a stabilizer, a colorant, etc., may be added.

The amount of the aromatic carbonate diester used for producing the copolymer of this invention preferably satisfies the following expression by a molar ratio.

$$1.0 \leq (C)/\{(A)-(B)\} \leq 1.5 \quad \text{(III)}$$

(A): Amount of diol component charged.
(B): Amount of dicarboxylic acid component charged.
(C): Amount of aromatic carbonate diester used.

When the amount of the aromatic carbonate diester used does not satisfy the range of the expression (III) and is small, undesirably, the polymerizing reaction does not proceed to an intended level of molecular weight. When the amount of the aromatic carbonate diester used does not satisfy the range of the expression (III) and is large, undesirably, the amount of a residual phenol increases.

According to the production process of this invention, there can be produced a polyester carbonate copolymer having a phenol content of preferably 1 to 100 ppm, more preferably 1 to 50 ppm, still more preferably 1 to 10 ppm.

In the ester exchange reaction, a polymerization catalyst can be used for promoting the reaction. As the above polymerization catalyst, preferably, an alkali metal compound, an alkaline earth metal compound or a heavy metal compound is used as a main component, and a nitrogen-containing basic compound is used as a secondary component as required.

The alkali metal compound includes sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium, potassium or lithium salt of bisphenol A, sodium benzoate, potassium benzoate, and lithium benzoate.

The alkaline earth metal compound includes calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

The nitrogen-containing basic compound includes tetramethylammonium hydroxide, tetraethylammonium hydroxide, tetrabutylammonium hydroxide, trimethylbenzylammonium hydroxide, trimethylamine, trietylamine, dimethylbenzylamine, triphenylamine, and dimethylaminopyridine.

As other ester-exchange catalyst, there may be employed salts of zinc, tin, zirconium, lead, titanium, germanium, antimony and osmium. For example, there are used zinc acetate, zinc benzoate, zinc 2-ethylhexanonate, tin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate, lead (IV) acetate, titanium (IV) tetrabutoxide, titanium tetraisopropoxide, titanium (IV)=tetrakis(2-ethyl-1-hexanolate), titanium oxide, and aluminum (III) tris(2,4-pentanedionate).

These catalysts may be used singly or in combination of two or more of them. The amount of the above catalyst per mole of total of the diol and dicarboxylic acid is preferably $1\times10^{-9}$ to $1\times10^{-3}$ mol, more preferably $1\times10^{-7}$ to $1\times10^{-3}$ mol. These may be used singly or in combination of two or more of them. In the ester-exchange reaction, diaryl carbonate having an electron-absorbing group may be added at the final stage, or after the end, of the polycondensing reaction for decreasing a hydroxy terminal group. Further, an antioxidant and a thermal stabilizer may be added for improving a color hue.

After completion of the polymerizing reaction, the catalyst may be removed or deactivated for maintaining thermal stability and stability against hydrolysis. In general, there is preferably carried out a method of adding a known acidic substance in order to deactivate the catalyst. The above substance includes esters such as butyl benzoate, aromatic sulfonic acids such as p-toluenesulfonic acid, aromatic sulfonic esters such as butyl p-toluenesulfonate and hexyl p-toluenesulfonate, phosphoric acids such as phosphorous acid, phosphoric acid and phosphonic acid, phosphites such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite, phosphates such as triphenyl phosphate, diphenyl phosphate, monophenyl phosphate, dibutyl phosphate, dioctyl phosphate and monooctyl phosphate, phosphonic acids such as diphenylphosphonic acid, dioctylphosphonic acid and dibutylphosphonic acid, phosphonates such as diethyl phenylphosphonate, phosphines such as triphenylphosphine and bis(diphenylphosphino)ethane, boric acids such as boric acid and phenylboric acid, aromatic sulfonates such as tetrabutylphosphonium dodecylbenzenesulfonate, organic halides such as stearic acid chloride, benzoyl chloride and p-toluenesulfonic acid chloride, alkyl sulfates such as dimethyl sulfate and organic halides such as benzyl chloride. These deactivators are preferably used in an amount, per mole of a catalyst, of 0.01 to 50 mol, more preferably 0.3 to 20 mol.

When the amount of deactivator per mole of the catalyst is smaller than 0.01 mol, undesirably, a deactivation effect is insufficient. When the above amount per mole of the catalyst is larger than 50 mol, undesirably, heat resistance decreases, and a molded product is liable to be colored. The deactivation of the catalyst may be followed by a step in which a low-boiling-point compound in the polymer is removed by volatilization under a pressure of 0.1 to 1 mmHg at a temperature of 200 to 320° C.

<Optical Lens>

The optical lens of this invention can be formed from the copolymer of this invention, for example, by injection molding, compression molding, injection compression molding or casting.

The optical lens of this invention may contain various additives for imparting it with various properties so long as the object of this invention is not impaired. As additives, there may be incorporated a mold release agent, a thermal stabilizer, an ultraviolet absorbent, a bluing agent, an antistatic agent, a flame retardant, a ray shielding agent, a fluorescent dye (including a fluorescent brightener), a pigment, a light scattering agent, a reinforcing filler, and other resin and elastomer.

In the mold release agent, preferably, at least 90% by weight thereof is formed of an ester of an alcohol and fatty acid. The ester of an alcohol and fatty acid specifically includes an ester of a monohydric alcohol and fatty acid, and a partial or whole ester of a polyhydric alcohol and fatty acid. The above ester of a monohydric alcohol and fatty acid is preferably an ester of a monohydric alcohol having 1 to 20 carbon atoms and a saturated fatty acid having 10 to 30 carbon atoms. Further, the partial or whole ester of a polyhydric alcohol and fatty acid is preferably a partial or whole ester of a polyhydric alcohol having 1 to 25 carbon atoms and a saturated fatty acid having 10 to 30 carbon atoms.

Specifically, the ester of a monohydric alcohol and saturated fatty acid includes stearyl stearate, palmityl palmitate, butyl stearate, methyl laurate and isopropyl palmitate. Stearyl stearate is preferred.

The partial or whole ester of a polyhydric alcohol and saturated fatty acid includes stearic acid monoglyceride, stearic acid diglyceride, stearic acid triglyceride, stearic acid monosorbitate, behenic acid monoglyceride, pentaerythritol monostearate, pentaerythritol tetrastearate, pentaerythritol tetrapelarogonate, propylene glycol monostearate, biphenyl biphenate, sorbitan monostearate, 2-ethylhexyl stearate, and a whole or partial ester of dipentaerythritol such as dipentaerythritol hexastearate. Of these, stearic acid monoglyceride, stearic acid triglyceride, pentaerythritol tetrastearate and a mixture of stearic acid triglyceride and stearyl stearate are preferred.

The content of the above ester in the mold release agent per 100% by weight of the mold release agent is preferably 90% by weight or more, more preferably 95% by weight or more.

The content of the mold release agent in the optical lens of this invention per 100 parts by weight of the copolymer is preferably in the range of 0.005 to 2.0 parts by weight, more preferably 0.01 to 0.6 part by weight, still more preferably 0.02 to 0.5 part by weight.

The thermal stabilizer includes a phosphorus-containing stabilizer, a sulfur-containing stabilizer and a hindered-phenol-containing stabilizer.

The phosphorus-containing stabilizer includes phosphorus acid, phosphoric acid, phosphonous acid, phosphonic acid and esters of these. Specifically, it includes triphenyl phosphite, tris(nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monoocytyldiphenyl phosphite, bis(2,6-di-tert-butyl-4-methylphenyl) pentaerythritol diphosphite, 2,2-methylenebis(4,6-di-tert-butylphenyl)octyl phosphite, bis(nonylphenyl) pentaerythritol diphosphite, bis(2,4-dicumylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenylmono-o-xenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite.

Of these, tris(2,4-di-tert-butylphenyl) phosphite, tris(2,6-di-tert-butylphenyl) phosphite, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite are preferably used. In particular, tetrakis(2,4-di-t-butylphenyl)-4,4'-biphenylene diphosphonite is preferred.

The content of the phosphorus-containing stabilizer in the copolymer per 100 parts by weight of the copolymer is preferably 0.001 to 0.2 part by weight.

The sulfur-containing thermal stabilizer includes pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate, and distearyl-3,3'-thiodipropionate. Of these, pentaerythritol-tetrakis(3-laurylthiopropionate), pentaerythritol-tetrakis(3-myristylthiopropionate), dilauryl-3,3'-thiodipropionate and dimyristyl-3,3'-thiodipropionate are preferred. In particular, pentaerythritol-tetrakis(3-laurylthiopropionate) is preferred. The above thioether compounds are commercially sold by Sumitomo Chemical Co., Ltd. as Sumilizer TP-D (trade name) and Sumilizer TPM (trade name), and they are easily available.

The content of the sulfur-containing thermal stabilizer in the copolymer per 100 parts by weight of the copolymer is preferably 0.001 to 0.2 part by weight.

The hindered-phenol-containing thermal stabilizer includes triethylene glycol-bis[3-(3-tert-butyl-5-methyl-4-hydroxyphenyl)propionate, 1,6-hexanediol-bis[3-(3,5-di-tert-butyl-4-hydroxyphenyl)propionate, pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), diethyl 3,5-di-tert-butyl-4-hydroxy-benzylphosphonate ester, tris(3,5-di-tert-butyl-4-hydroxybenzyl)isocyanurate, and 3,9-bis{1,1-dimethyl-2-[β-(3-tert-butyl-4-hydroxy-5-methylphenyl)propionyloxy]ethyl}-2,4,8,10-tetraoxaspiro(5,5)undecane. In particular, octadecyl-3-(3,5-di-tert-butyl-4-hydroxyphenyl)propionate is preferably used.

The content of the hindered-phenol-containing thermal stabilizer in the copolymer per 100 parts by weight of the copolymer is preferably 0.001 to 0.3 part by weight.

The ultraviolet absorbent is preferably at least one ultraviolet absorbent selected from the group consisting of a benzotriazole-containing ultraviolet absorbent, a benzophenone-containing ultraviolet absorbent, a triazine-containing ultraviolet absorbent, a cycloiminoester-containing ultraviolet absorbent and a cyanoacrylate-containing ultraviolet absorbent.

The benzotriazole-containing ultraviolet absorbent includes 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methyphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzooxazin-4-one) and 2-[2-hydroxy-3-(3,4,5,6-tetrahydrophthalimidomethyl)-5-methylphenyl]benzotriazole. These may be used singly or as a mixture of two or more of them.

Preferred are 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methyphenyl)-5-chlorobenzotriazole, 2,2'-methylenebis[4-(1,1,3,3-tetramethylbutyl)-6-(2H-benzotriazol-2-yl)phenol] and 2-[2-hydroxy-3-(3,4,5,6-tetrahydrophthalimidomethyl)-5-methylphenyl]benzotriazole.

More preferred are 2-(2-hydroxy-5-tert-octylphenyl)benzotriazole and 2,2'-methylenebis[4-(1,1,3,3-tetramethylbutyl)-6-(2H-benzotriazol-2-yl)phenol].

The benzophenone-containing ultraviolet absorbent includes 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrideratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

The triazine-containing ultraviolet absorbent includes 2-(4,6-diphenyl-1,3,5-triazin-2-yl)-5-[(hexyl)oxy]phenol and 2-(4,6-bis(2,4-dimethylphenyl)-1,3,5-triazin-2-yl)-5-[(octyl)oxy]-phenol.

The cycloiminoester-containing ultraviolet absorbent includes 2,2'-bis(3,1-benzooxazin-4-one), 2,2'-p-phenylenebis(3,1-benzooxazin-4-one), 2,2'-m-phenylenebis(3,1-benzooxazin-4-one), 2,2'-(4,4'-diphenylene)bis(3,1-benzooxazin-4-one), 2,2'-(2,6-naphthalene)bis(3,1-benzooxazin-4-one), 2,2'-(1,5-naphthalene)bis(3,1-benzooxazin-4-one), 2,2'-(2-methyl-p-phenylene)bis(3,1-benzooxazin-4-one), 2,2'-(2-nitro-p-phenylene)bis(3,1-benzooxazin-4-one), and 2,2'-(2-chloro-p-phenylene)bis(3,1-benzooxazin-4-one). Of these, 2,2'-p-phenylenebis(3,1-benzooxazin-4-one), 2,2'-(4,4'-diphenylene)bis(3,1-benzooxazin-4-one) and 2,2'-(2,6-naphthalene)bis(3,1-benzooxazin-4-one) are preferred, and 2,2'-p-phenylenebis(3,1-benzooxazin-4-one) is particularly preferred. These compounds are commercially available by Takemoto Yushi K.K. as CEi-P (trade name) and easily available.

The cyanoacrylate-containing ultraviolet absorbent includes 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The content of the ultraviolet absorbent per 100 parts by weight of the copolymer is preferably 0.001 to 3.0 parts by weight, more preferably 0.02 to 1.0 part by weight, still more preferably 0.05 to 0.8 part by weight. When the content is within the above range, molded products from the copolymer can be imparted with sufficient weatherability depending upon fields of use.

The bluing agent includes Macrolex Violet B and Macrolex Blue-RP supplied by Bayer AG and Polysynthrene Blue-RLS supplied by Clariant Corporation. The bluing agent is effective for offsetting the yellow tint of the copolymer. When the copolymer is imparted with weatherability, a certain amount of the ultraviolet absorbent is incorporated, so that the molded product is liable to have an yellow tint due to the function and color of the ultraviolet absorbent. In particular, the incorporation of the bluing agent is very effective for imparting a sheet or lens with a natural transparency.

The amount of the bluing agent based on the copolymer is preferably 0.05 to 1.5 ppm, more preferably 0.1 to 1.2 ppm.

Further, the optical lens of this invention has small optical strain. An optical lens formed from a generally used bisphenol A type polycarbonate resin has a large optical strain. The optical strain thereof could be decreased depending upon molding conditions, while the conditions are very strict, so that molding is very difficult. In the polyester carbonate copolymer of this invention, its optical strain caused by the orientation of the resin is very small, and its molding strain is also small, so that excellent optical elements can be obtained without strictly setting moldings conditions.

When the optical lens of this invention is produced by injection molding, the molding is preferably carried out under conditions of a cylinder temperature of 260 to 300° C. and a mold temperature of 100 to 140° C.

The optical lens of this invention can be suitably used as an aspherical lens as required. The aspherical lens is capable of substantially bringing a spherical aberration to zero with one lens, so that a combination of a plurality of spherical lens is not required to remove a spherical aberration, so that a decrease in weight and in product cost can be made possible. Of optical lenses, therefore, the aspherical lens is in particular useful as a camera lens.

Further, having high flowability, the copolymer of this invention is in particular useful as a material for thin and compact optical lenses having complicated forms. As a lens size, specifically, the thickness of a central portion is 0.05 to 3.0 mm, preferably 0.05 to 2.0 mm, more preferably 0.1 to 2.0 mm. Further, the diameter of the lens is 1.0 mm to 20.0 mm, preferably 1.0 to 10.0 mm, more preferably 3.0 to 10.0 mm. Such an optical lens is preferably a meniscus lens of which one side is convex and the other side is concave.

The surface of the optical lens of this invention may be provided with a coating layer such as an anti-reflection layer or a hard coating layer as required. The anti-reflection layer may be any one of a single layer and a multi-layer, and it may be of an organic material or of an inorganic material, while it is preferably of an inorganic material. Specifically, examples of the material include oxides or fluorides such as silicon oxide, aluminum oxide, zirconium oxide, titanium oxide, cerium oxide, magnesium oxide and magnesium fluoride.

EXAMPLES

This invention will be further explained below with reference to Examples.

Examples 1-3 and Comparative Examples 1-2

Evaluations were made according to the following methods.

(1) Specific viscosity: Polyester carbonate copolymer pellets obtained after completion of polymerization were fully dried, 0.7 g of the pellets were dissolved in 100 ml of methylene chloride to obtain a solution, and the solution was measured at 20° C. for a specific viscosity ($\eta_{sp}$).

(2) Copolymerization ratio: Measured using proton NMR of JNM-AL400 supplied by JEOL Ltd. It was determined from an integral ratio of peaks derived from 9,9-bis(4-(2-hydroxyethoxy)phenyl)fluorene at 7.6 to 7.8 ppm and peak derived from naphthalenedicarboxylic acid at around 8.6 ppm as shown in FIG. 1.

(3) Glass transition temperature (Tg): Polyester carbonate copolymer pellets obtained after completion of polymerization were measured with DSC model 910 supplied by Du Pont de Nemours Co., Ltd. at a temperature elevation rate of 20° C./minute.

(4) Melt viscosity: Polyester carbonate copolymer pellets obtained after completion of polymerization were measured for a melt viscosity at 280° C. at a shear rate of 1,000/second with a Capirograph 1D supplied by Toyo Seiki Seisaku-sho, Ltd.

(5) Refractive index (nd) and Abbe's number (v): A 0.3 mm thick disc obtained by injection molding was measured for a refractive index (wavelength: 589 nm) and an Abbe's number at 25° C. with an Abbe refractometer DR-M2 supplied by ATAGO.

(6) Orientation birefringence (Δn): A 100 μm thick cast film was stretched twice at Tg+10° C. and measured for a retardation (Re) at 589 nm with an ellipsometer M-220 supplied by JASCO Corporation, and an orientation birefringence (Δn) was determined on the basis of the following expression.

$$\Delta n = Re/d$$

Δn: Orientation birefringence
Re: Retardation
d: Thickness (7) Optical strain: A lens obtained by molding was sandwiched between two polarizing plates, and light leakage from behind was visually observed under crossed Nicols to evaluate an optical strain. The evaluation was made on the basis of the following ratings.

◎: Almost no light leakage is observed.
○: Slight light leakage is observed.
X: Notable light leakage is observed.

(8) Spectral transmittance: A 0.1 mm thick disc obtained by injection molding was measured with a spectrophotometer U-3310 supplied by Hitachi, Ltd.

Evaluations were carried out as follows.
The transmittance at 395 nm is 80% or more: ○
The transmittance at 395 nm is lower than 80%: X (9) Wet heat test: A 1 mm thick plate was left under conditions of 85° C. and 85% RH for 400 hours, and then its appearance was visually evaluated. Further, 0.7 g of the above molded piece was dissolved in 100 ml of methylene chloride, and the resultant solution was measured for a specific viscosity ($\eta_{sp}$) at 20° C., to determine a specific viscosity holding ratio (molecular weight holding ratio) after the wet heat test.

$$\Delta\eta_{sp}=(\eta_{sp1}/\eta_{sp0})\times100$$

$\Delta\eta_{sp}$: Specific viscosity holding ratio
$\eta_{sp0}$: Specific viscosity before test
$\eta_{sp1}$: Specific viscosity after test Example 1

Synthesis 157.86 Parts by weight of 9,9-bis(4-(2-hydroxyethoxy)phenyl)fluorene (BPEF), 9.77 parts by weight of 2,6-naphthalenedicarboxylic acid component (to be sometimes abbreviated as "NDCM" hereinafter), 71.98 parts by weight of diphenyl carbonate (to be sometimes abbreviated as "DPC" hereinafter), $8\times10^{-6}$ part by weight of sodium hydroxide and $3.65\times10^{-3}$ part by weight of tetramethylammonium hydroxide were placed in a reaction vessel equipped with a stirrer and a distillation apparatus, and under a nitrogen atmosphere of 760 Torr, they were heated to 180° C. and stirred for 20 minutes. Then, the degree of a reduced pressure was adjusted to 20 kPa over 20 minutes, and the temperature was raised up to 250° C. at a rate of 60° C./hour to carry out an ester-exchange reaction. While maintaining 250° C. or less, the pressure was reduced to 1 Torr or less over 60 minutes, and a polymerizing reaction was carried out under conditions of 250° C. and 1 Torr or less with stirring for 1 hour.

After completion of the reaction, nitrogen was blown into the reactor to render the inside of the reactor pressurized, and then $1.54\times10^{-4}$ part by weight of tetrabutylphosphonium dodecylbenzenesulfonate was added to deactivate the catalyst. Then, a generated polyester carbonate copolymer was withdrawn with pelletizing it. The above polyester carbonate copolymer had a molar ratio of BPEF to NDCM of 90:10, a specific viscosity of 0.193, a Tg of 151° C. and a melt viscosity of 90 Pa·s.

The thus-obtained polymer was vacuum-dried at 120° C. for 4 hours, 0.050% of bis(2,4-dicumylphenyl)pentaerythritol diphosphite and 0.10% of pentaerythritol tetrastearate were added, and the mixture was pelletized with a vented φ30 mm single-screw extruder.
(Cast Film)

The above pellets were dissolved in methylene chloride, then, cast on a glass dish and dried to give a 100 μm thick cast film. Table 1 shows the result of its evaluation for orientation birefringence (Δn).
(0.3 mm Thick Disc)

A 0.3 mm thick φ5 mm disc was injection-molded with an injection molding machine SE30DU supplied by Sumitomo Heavy Industries, Ltd. at a cylinder temperature of 280° C. and a mold temperature of 100° C. Table 1 shows the results of its evaluations for refractive index (nd) and Abbe's number (ν).
(Lens)

A lens having a thickness of 0.3 mm, a convex surface curvature radius of 5 mm, a concave surface curvature radius of 4 mm and a diameter of φ5 mm was injection-molded with an injection molding machine SE30DU supplied by Sumitomo Heavy Industries, Ltd. at a cylinder temperature of 280° C. and a mold temperature of 100° C. Table 1 shows the result of its evaluation for an optical strain.
(0.1 mm Thick Disc)

A 0.1 mm thick φ5 mm disc was injection-molded with an injection molding machine SE30DU supplied by Sumitomo Heavy Industries, Ltd. at a cylinder temperature of 280° C. and a mold temperature of 100° C. Table 1 shows the result of its evaluation result for a spectral transmittance.
(1 mm Thick Plate)

A plate having a thickness of 1 mm, a width of 2.5 cm and a length of 5 cm was injection-molded with an injection molding machine SE30DU supplied by Sumitomo Heavy Industries, Ltd. at a cylinder temperature of 280° C. and a mold temperature of 100° C.

The thus-obtained plate had a $\Delta\eta_{sp}$ holding ratio of 99%, and it had no change in appearance after the wet heat test.

Example 2

A polyester carbonate copolymer was synthesized in the same manner as in Example 1 except that the amount of BPEF was changed to 149.09 parts by weight, that the amount of NDCM was changed to 14.66 parts by weight and that the amount of DPC was changed to 63.41 parts by weight. The above polyester carbonate copolymer had a BPEF to NDCM molar ratio of 85:15, a specific viscosity of 0.184, a Tg of 151° C. and a melt viscosity of 96 Pa·s.

A cast film, a 0.3 mm thick disc, a lens, and a 1 mm thick plate were obtained in the same manner as in Example 1. Table 1 shows the results of measurements of them for orientation birefringence (Δn), a refractive index (nd), an Abbe's number (ν), an optical strain and a spectral transmittance. The 1 mm thick plate had a $\Delta\eta_{sp}$ holding ratio of 98%, and it had no change in appearance after the wet heat test.

Example 3

A polyester carbonate copolymer was synthesized in the same manner as in Example 1 except that the amount of BPEF was changed to 166.63 parts by weight, that the amount of NDCM was changed to 4.89 parts by weight and that the amount of DPC was changed to 77.12 parts by weight. The above polyester carbonate copolymer had a BPEF to NDCM molar ratio of 95:5, a specific viscosity of 0.197, a Tg of 149° C. and a melt viscosity of 84 Pa·s.

A cast film, a 0.3 mm thick disc, a lens, and a 1 mm thick plate were obtained in the same manner as in Example 1. Table 1 shows the results of measurements of them for orientation birefringence (Δn), a refractive index (nd), an Abbe's number (ν), an optical strain and a spectral transmittance. The 1 mm thick plate had a $\Delta\eta_{sp}$ holding ratio of 98%, and it had no change in appearance after the wet heat test.

Comparative Example 1

A polyester carbonate copolymer was synthesized in the same manner as in Example 1 except that the amount of BPEF was changed to 105.24 parts by weight, that the amount of NDCM was changed to 39.08 parts by weight and that the amount of DPC was changed to 21.42 parts by weight. The above polyester carbonate copolymer had a BPEF to NDCM molar ratio of 60:40, a specific viscosity of 0.280, a Tg of 160° C. and a melt viscosity of 306 Pa·s.

A cast film, a 0.3 mm thick disc, a lens, and a 1 mm thick plate were obtained in the same manner as in Example 1. Table 1 shows the results of measurements of them for orientation birefringence (Δn), a refractive index (nd), an Abbe's number (ν), an optical strain and a spectral transmittance.

Comparative Example 2

43.85 Parts by weight of BPEF, 11.27 parts by weight of diphenyl carbonate, $5.04\times10^{-5}$ part by weight of sodium hydrogencarbonate and $5.52 \times 10^{-3}$ part by weight of tetramethylammonium hydroxide were placed in a 10-liter reactor equipped with a stirrer and a distillation apparatus, and under a nitrogen atmosphere of 760 Torr, they were heated to 215° C. over 1 hour and stirred.

Then, the degree of a reduced pressure was adjusted to 150 Torr over 15 minutes, and they were held under conditions of 215° C. and 150 Torr for 20 minutes to carry out an ester-exchange reaction. Further, the reaction mixture was raised to 240° C. at a rate of 37.5° C./hour and held at 240° C. at 150 Torr for 10 minutes. Then, the degree of the pressure was adjusted to 120 Torr over 10 minutes, and the reaction mixture was held at 240° C. at 120 Torr for 70 minutes. Then, the degree of the pressure was adjusted to 100 Torr over 10 minutes, and the reaction mixture was held at 240° C. at 100 Torr for 10 minutes. Further, the degree of the pressure was adjusted to 1 Torr over 40 minutes, and the reaction mixture was subjected to a polymerizing reaction under conditions of 240° C. and 1 Torr with stirring for 10 minutes.

After completion of the reaction, nitrogen was blown into the reactor to render the inside of the reactor pressurized, and then $7.01 \times 10^{-4}$ part by weight of tetrabutylphosphonium dodecylbenzenesulfonate was added to deactivate the catalyst. Then, a generated polyester carbonate copolymer was withdrawn with pelletizing it to give a BPEF homopolymer. The thus-obtained polymer had a specific viscosity of 0.200, a Tg of 149° C. and a melt viscosity of 81 Pa·s.

A cast film, a 0.3 mm thick disc, a lens, and a 1 mm thick plate were obtained in the same manner as in Example 1. Table 1 shows the results of measurements of them for orientation birefringence ($\Delta n$), a refractive index (nd), an Abbe's number (v), an optical strain and a spectral transmittance. The 1 mm thick disc had no change in appearance after the wet heat test.

It was found on the basis of IR measurement that the polyester carbonate copolymers obtained in Examples 1 to 3 had an absorption derived from a carbonate bond around 1,775 cm$^{-1}$ and an absorption derived from ester bond around 1,740 cm$^{-1}$. Further, it was found that they were random copolymers since they had one peak derived from a Tg obtained by DSC measurement. Further, it was shown in the proton NMR in FIG. 1 that the polymer obtained in Example 1 was a polyester carbonate copolymer of BPEF and NDCM.

TABLE 1

| | Compositional ratio of raw materials | | Compositional ratio of copolymer | | Evaluation Results | | |
|---|---|---|---|---|---|---|---|
| | BPEF mol % | NDCM mol % | Formula (I) mol % | Formula (II) mol % | Tg ° C. | $\Delta n \times 10^{-3}$ | MV*1 Pa·s |
| Ex. 1 | 90 | 10 | 89 | 11 | 151 | 0.4 | 90 |
| Ex. 2 | 85 | 15 | 82 | 18 | 151 | 2.1 | 96 |
| Ex. 3 | 95 | 5 | 95 | 5 | 149 | 0.9 | 84 |
| CEx. 1 | 60 | 40 | 33 | 67 | 160 | >10 | 306 |
| CEx. 2 | 100 | — | 100 | 0 | 149 | >10 | 81 |

| | Molding conditions | | Evaluation results | | | |
|---|---|---|---|---|---|---|
| | Cylinder temperature ° C. | Mold temperature ° C. | Refractive index (n$_d$) | Abbe's number (v) | Optical strain | Spectral transmittance |
| Ex. 1 | 280 | 100 | 1.641 | 23 | ⊚ | ○ |
| Ex. 2 | 280 | 100 | 1.644 | 23 | ⊚ | ○ |
| Ex. 3 | 280 | 100 | 1.640 | 24 | ⊚ | ○ |
| CEx. 1 | 280 | 100 | 1.651 | 22 | X | X |
| CEx. 2 | 280 | 100 | 1.639 | 24 | X | ○ |

Ex.: Example
CEx. Comparative Example
MV*1 = Melt viscosity
BPEF: 9,9-bis(4-(2-hydroxyethoxy)phenyl)fluorene component
NDCM: 1,6-naphthalenedicarboxylic acid component The polyester carbonate copolymers obtained in Examples 1 to 3 have remarkably small inherent birefringence ($\Delta n$) even when molecular-oriented during the injection molding thereof, so that the optical strains of the lenses obtained therefrom are small. Further, their melt-viscosities are low, and their molding temperatures can be lowered, so that their resins are free from thermal decomposition and a change in hue, and excellent lenses can be obtained. Further, since high refractivity is achieved even if the amount of naphthalenedicarboxylic acid introduced is small, so that their transmittances are not much lowered. Therefore, optical lenses obtained have high refractivity and transparency, have small optical strains and have excellent resistance to wet heat, so that the optical lenses are excellent as such.

In contrast, the polymers obtained in Comparative Examples 1 and 2 have large inherent birefringence ($\Delta n$), so that the optical strains of the lenses obtained therefrom are large. Further, since the polymer obtained in Comparative Example 1 has a high melt-viscosity, it is required to mold the polymer at a high temperature, so that it is difficult to obtain excellent lenses. Further, since they contain many naphthalene rings, their transmittance to visible light is low. Therefore, the polymers obtained in Comparative Examples 1 and 2 are limited in the range of use as optical lenses.

Examples 4-6 and Comparative Examples 3-5

Evaluations in Examples 4 to 6 and Comparative Examples 3 to 5 were made according to the following methods.

(1) Specific viscosity: Polyester carbonate copolymer pellets obtained after completion of polymerization were dried at 120° C. for 4 hours, and 0.35 g of the pellets were dissolved in 50 cc of methylene chloride to prepare a solution as a measurement sample. In the measurement, the solution was measured for a time period taken to pass between the marker lines of an Oswald viscosity tube in a constant-temperature chamber at 20±0.01° C., and the specific viscosity ($\eta_{sp}$) of the solution at 20° C. was determined on the basis of the following expression.

$$\eta_{sp} = (t_1 - t_0)/t_0$$

Figure 2:
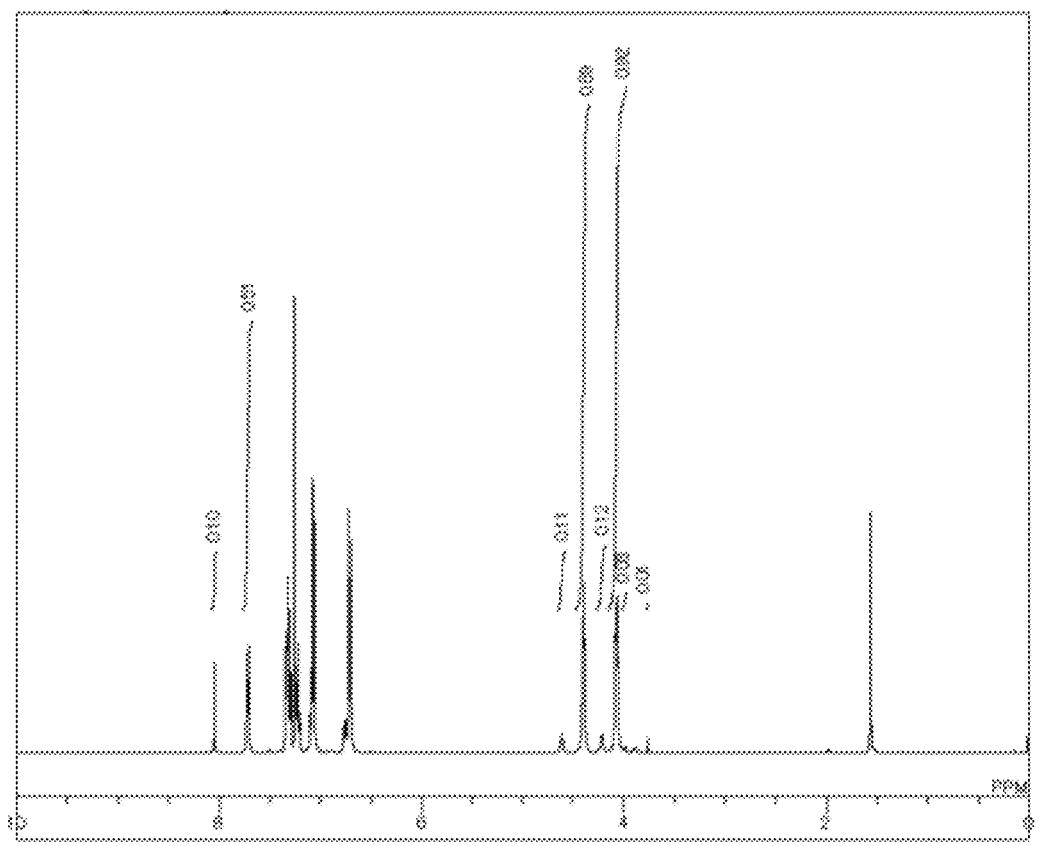
FIG. 2 is the proton NMR of a polyester carbonate copolymer obtained in Example 4.

$t_1$: Time period for the polymer solution taken to pass between the marker lines $t_0$: Time period for methylene chloride taken to pass between the marker lines (2) Copolymerization ratio: Measured by using proton NMR of JNM-AL400 supplied by JEOL Ltd. It was determined from an integral ratio of peaks derived from 9,9-bis(4-(2-hydroxyethoxy)phenyl)fluorene at 7.65 to 7.85 ppm and peaks derived from terephthalic acid at 7.98 to 8.18 ppm as shown in FIG. 2.

(3) Glass transition temperature (Tg): Polyester carbonate copolymer pellets obtained after completion of polymerization were measured with DSC model 910 supplied by Du Pont de Nemours Co., Ltd. at a temperature elevation rate of 20° C./minute.

(4) Melt viscosity: Polyester carbonate copolymer pellets obtained after completion of polymerization were dried at 120° C. for 4 hours and measured for a melt viscosity at 280° C. at a shear rate of 1,000/second with a Capirograph 1D supplied by Toyo Seiki Seisaku-sho, Ltd.

(5) Refractive index ($n_d$) and Abbe's number (v): A 0.1 mm thick disc was measured for a refractive index (wavelength: 589 nm) at 25° C. and an Abbe's number with an Abbe refractometer DR-M2 supplied by ATAGO using 1-bromonaphthalene as an intermediate liquid.

(6) Orientation birefringence (Δn): A 100 μm cast film was cut in the casting direction to have a length of 7 cm and in the direction (width direction) crossed at right angles with the casting direction to have a width of 1.5 cm, and the both ends of the cut piece in the longitudinal direction were pinched with chucks (inter-chuck distance 4.5 cm). The cut piece was stretched twice at Tg+10° C. of the polyester carbonate resin and measured for a retardation (Re) at 589 nm with an ellipsometer M-220 supplied by JASCO Corporation, and an orientation birefringence (Δn) was determined on the basis of the following expression.

$$\Delta n = Re/d$$

Δn: Orientation birefringence
Re: Retardation
d: Thickness (7) Optical strain: A 0.3 mm thick lens obtained by molding was sandwiched between two polarizing plates, and light leakage from behind was visually observed under crossed Nicols to evaluate an optical strain. The evaluation was made on the basis of the following ratings.
⊚: Almost no light leakage is observed.
◯: Slight light leakage is observed.
X: Notable light leakage is observed.

(8) Spectral transmittance: A 0.1 mm thick plate was measured for a spectral transmittance at 365 nm with a spectrophotometer U-3310 supplied by Hitachi, Ltd.

(9) Resistance to wet heat: A 1 mm thick plate was left under conditions of 85° C. and 85% RH for 400 hours, and then its appearance was visually evaluated. Further, 0.7 g of the above molded piece was dissolved in 100 ml of methylene chloride, and the resultant solution was measured for a specific viscosity ($\eta_{sp}$) at 20° C., to determine a specific viscosity holding ratio (molecular weight holding ratio) after the wet heat test.

$$\Delta\eta_{sp} = (\eta_{sp1}/\eta_{sp0}) \times 100$$

$\Delta\eta_{sp}$: Specific viscosity holding ratio
$\eta_{sp0}$: Specific viscosity before test
$\eta_{sp1}$: Specific viscosity after test

(10) Water absorption: A 1 mm thick plate was left in water at 23° C. for 28 days, water on the surface of the molded plate was wiped off, and a difference in weight before and after the test was measured, to determine a saturated absorption.

$$C = \{(w_2 - w_1)/w_1\} \times 100$$

C: Saturated absorption
$w_1$: Weight before test
$w_2$: Weight after test

Example 4

Synthesis 157.86 Parts by weight of 9,9-bis(4-hydroxyethoxy)phenyl)fluorene (BPEF), 7.77 parts by weight of dimethyl terephthalate (to be sometimes abbreviated as "TPAM" hereinafter), 71.98 parts by weight of diphenyl carbonate (DPC) and 13.6×10$^{-3}$ part by weight of titanium tetrabutoxide were placed in a reaction vessel equipped with a stirrer and a distillation apparatus, and under nitrogen atmosphere and atmospheric pressure, they were heated to 180° C. and stirred for 20 minutes. Then, the degree of reduced pressure was adjusted to 20 to 30 kPa over 20 minutes, and they were raised to 250° C. at a rate of 60° C./hour to carry out an ester-exchange reaction. Then, while the temperature was maintained at 250° C., the pressure was reduced to 0.13 kPa over 120 minutes, and a polymerizing reaction was carried out under conditions of 250° C. and 0.13 kPa or lower for 1 hour with stirring.

Then, a formed polyester carbonate copolymer was withdrawn with pelletizing it. The above polyester carbonate copolymer had a BPEF to terephthalic acid (TPA) molar ratio of 90:10, a specific viscosity of 0.192, a Tg of 147° C. and a melt viscosity of 88 Pa·s.

The thus-obtained polymer was vacuum-dried at 120° C. for 4 hours, and based on a resin composition to be obtained, 0.050% of bis(2,4-dicumylphenyl)pentaerythritol diphosphite and 0.10% of pentaerythritol tetrastearate were added, followed by pelletization with a vented ϕ30 mm single-screw extruder.

(Cast Film)

The above pellets were dissolved in methylene chloride, then, cast on a glass dish and dried to give a 100 μm thick cast film. Table 2 shows the result of its measurement for orientation birefringence (Δn).

(Lens)

A lens having a thickness of 0.3 mm, a convex surface curvature radius of 5 mm, a concave surface curvature radius of 4 mm and a diameter of ϕ5 mm was injection-molded with an injection molding machine SE30DU supplied by Sumitomo Heavy Industries, Ltd. at a cylinder temperature of 270° C. and a mold temperature of 140° C. Table 2 shows the result of its evaluation for an optical strain.

(Disc)

A 0.1 mm thick ϕ30 mm disc was injection-molded with an injection molding machine SE30DU supplied by Sumitomo Heavy Industries, Ltd. at a cylinder temperature of 270° C. and a mold temperature of 140° C. Table 2 shows the results of its measurements for a refractive index ($n_d$) and an Abbe's number (v).

(Plate)

A plate having a thickness of 1 mm, a width of 2.5 cm and a length of 5 cm was injection-molded with an injection molding machine SE30DU supplied by Sumitomo Heavy Industries, Ltd. at a cylinder temperature of 270° C. and a mold temperature of 140° C. The thus-obtained molded piece had a $\Delta\eta_{sp}$ holding ratio (molecular weight holding ratio) of 100% after a wet heat test, and it had no change in appearance. The obtained plate had a water absorption of 0.48%.

Example 5

A polyester carbonate copolymer was synthesized in the same manner as in Example 4 except that the amount of BPEF was changed to 140.32 parts by weight, that the amount of TPAM was changed to 15.54 parts by weight and that the amount of DPC was changed to 54.84 parts by weight. The thus-obtained polyester carbonate copolymer had a BPEF to TPA molar ratio of 80:20, a specific viscosity of 0.201, a Tg of 148° C. and a melt viscosity of 96 Pa·s.

A cast film, a lens, a disc and a plate were obtained in the same manner as in Example 4. Table 2 shows the results of measurements of them for an orientation birefringence ($\Delta n$), an optical strain, a refractive index ($n_d$), an Abbe's number ($\nu$) and a spectral transmittance. The plate had a $\Delta\eta_{sp}$ holding ratio (molecular weight holding ratio) of 99% after a wet heat test, and it had no change in color hue. Further, the plate had a water absorption of 0.51%.

Example 6

A polyester carbonate copolymer was synthesized in the same manner as in Example 4 except that the amount of BPEF was changed to 131.55 parts by weight, that the amount of TPAM was changed to 19.42 parts by weight and that the amount of DPC was changed to 54.84 parts by weight. The thus-obtained polyester carbonate copolymer had a BPEF to TPA molar ratio of 75:25, a specific viscosity of 0.197, a Tg of 149° C. and a melt viscosity of 155 Pa·s.

A cast film, a lens, a disc and a plate were obtained in the same manner as in Example 4. Table 2 shows the results of measurements of them for an orientation birefringence ($\Delta n$), an optical strain, a refractive index ($n_d$), an Abbe's number ($\nu$) and a spectral transmittance. The obtained molded piece had a $\Delta\eta_{sp}$ holding ratio of 100% after a wet heat test, and it had no change in color hue. Further, the obtained plate had a water absorption of 0.51%.

Comparative Example 3

A polyester carbonate copolymer was synthesized in the same manner as in Example 4 except that the amount of BPEF was changed to 122.78 parts by weight, that the amount of TPAM was changed to 23.30 parts by weight and that the amount of DPC was changed to 35.99 parts by weight. The thus-obtained polyester carbonate copolymer had a BPEF to TPA molar ratio of 70:30, a specific viscosity of 0.201, a Tg of 151° C. and a melt viscosity of 252 Pa·s.

A cast film, a lens, a disc and a molded piece were obtained in the same manner as in Example 4. Table 2 shows the results of measurements of them for an orientation birefringence ($\Delta n$), an optical strain, a refractive index ($n_d$), an Abbe's number ($\nu$) and a spectral transmittance. The obtained molded piece had a $\Delta\eta_{sp}$ holding ratio of 97% after a wet heat test, and it had no change in color hue. Further, the obtained plate had a water absorption of 0.51%.

Comparative Example 4

A reactor with a thermometer, a stirrer and a dropping funnel was charged with 38 parts of pyridine and 360 parts of methylene chloride, and 48.4 parts of 9,9-bsi[4-(2-hydroxyethoxy)phenyl]fluorene was dissolved therein. While they were stirred, 9.6 parts of phosgene was blown thereinto at 15 to 25° C. over 25 minutes. At the same time, a solution of 10.4 parts of terephthalic acid chloride (30 mol % based on the total molar amount of the diol and aromatic dicarboxylic acid components) and 0.54 part of p-tert-butylphenol into 100 parts of methylene chloride were dissolved dropwise added.

After completion of the blowing introduction of the phosgene, they were further stirred at 28 to 33° C. for 1 hour to complete the reaction. After completion of the reaction, the reaction product was diluted with methylene chloride and then washed with water, and then it was rendered acidic with hydrochloric acid and washed with water. When the conductivity of an aqueous phase became almost equal to that of ion-exchanged water, methylene chloride was volatilized to give 55.3 parts (yield 95%) of a colorless polyester carbonate resin. This polymer had an ester group amount ratio of 30 mol %, a specific viscosity of 0.381, a glass transition temperature of 162° C. and a melt viscosity of 630 Pa·s.

A cast film, a lens, a disc and a molded piece were obtained in the same manner as in Example 4. Table 2 shows the results of measurements of them for an orientation birefringence ($\Delta n$), an optical strain, a refractive index ($n_d$), an Abbe's number ($\nu$) and a spectral transmittance. The obtained molded piece had a $\Delta\eta_{sp}$ holding ratio of 90% after a wet heat test, and it was colored in yellowish brown. Further, the obtained plate had a water absorption of 0.53%.

Comparative Example 5

A reactor equipped with a stirrer and a distillation apparatus was charged with 175.40 parts by weight of BPEF, 87.40 parts by weight of DPC, $1.60 \times 10^{-5}$ part by weight of sodium hydroxide and $3.65 \times 10^{-3}$ part by weight of tetramethylammonium hydroxide, and under a nitrogen atmosphere and atmospheric pressure, they were heated to 180° C. and stirred for 20 minutes. Then, the reduced pressure degree was adjusted to 20 to 30 kPa over 20 minutes, and they were raised up to 250° C. at a rate of 60° C./hour to carry out an ester-exchange reaction. Then, while the temperature was maintained at 250° C., the pressure was decreased to 0.13 kPa or less over 120 minutes, and under conditions of 250° C. and 0.13 kPa or lower, a polymerizing reaction was carried out with stirring for 1 hour. After completion of the reaction, nitrogen was blown into the reactor to increase the pressure, and then $4.67 \times 10^{-4}$ part by weight of tetrabutylphosphonium dodecylbenzenesulfonate was added to deactivate the catalyst. Then, the generated polycarbonate resin was withdrawn with pelletizing it, to give a BPEF homopolymer. The thus-obtained polymer had a specific viscosity of 0.200, a Tg of 145° C. and a melt viscosity of 81 Pa·s.

A cast film, a lens, a disc and a molded piece were obtained in the same manner as in Example 4. Table 2 shows the results of measurements of them for an orientation birefringence ($\Delta n$), an optical strain, a refractive index ($n_d$), an Abbe's number ($\nu$) and a spectral transmittance. The obtained molded piece had a $\Delta\eta_{sp}$ holding ratio of 99% after a wet heat test, and it had no change in color hue. Further, the obtained plate had a water absorption of 0.55%.

It was found on the basis of IR measurement that the polymers obtained in Examples 4 to 6 had an absorption derived from a carbonate bond around 1,775 $cm^{-1}$ and an absorption derived from ester around 1,740 $cm^{-1}$. Further, it was found that they were random copolymers since they had one peak derived from a Tg obtained by DSC measurement. Further, it was shown in the proton NMR in FIG. 2 that the polymer obtained in Example 4 was a polyester carbonate copolymer of BPEF and TPA.

TABLE 2

| | Compositional ratio of raw materials | | Compositional ratio of copolymer | | Evaluation results | | | |
|---|---|---|---|---|---|---|---|---|
| | BPEF mol % | TPA mol % | Formula (I) mol % | Formula (II) mol % | SV*1 — | Tg °C. | Δn ×10$^{-3}$ | MV*2 Pa·s |
| Ex. 4 | 90 | 10 | 89 | 11 | 0.192 | 147 | 0.63 | 88 |
| Ex. 5 | 80 | 20 | 75 | 25 | 0.201 | 148 | 0.59 | 96 |
| Ex. 6 | 75 | 25 | 67 | 33 | 0.197 | 149 | 3.1 | 155 |
| CEx. 3 | 70 | 30 | 57 | 43 | 0.201 | 151 | >4 | 252 |
| CEx. 4 | 70 | 30 | 57 | 43 | 0.381 | 162 | >4 | 630 |
| CEx. 5 | 100 | — | 100 | 0 | 0.200 | 145 | >4 | 81 |

| | Molding conditions | | Optical measurement results | | | |
|---|---|---|---|---|---|---|
| | Cylinder temperature °C. | Mold temperature °C. | Refractive index ($n_d$) | Abbe's number (ν) | Spectral transmittance (365 nm) % | Optical strain — |
| Ex. 4 | 270 | 140 | 1.638 | 23 | 81 | ○ |
| Ex. 5 | 270 | 140 | 1.639 | 23 | 80 | ⊚ |
| Ex. 6 | 270 | 140 | 1.639 | 23 | 80 | ○ |
| CEx. 3 | 270 | 140 | 1.640 | 23 | 81 | Δ |
| CEx. 4 | 270 | 140 | 1.640 | 23 | 80 | X |
| CEx. 5 | 270 | 140 | 1.635 | 24 | 83 | X |

SV*1 = Specific viscosity
MV*2 = Melt viscosity
Ex. = Example,
CEx. = Comparative Example
BPEF: 9,9-bis(4-(2-hydroxyethoxy)phenyl)fluorene component
TPA: Terephthalic acid component The polyester carbonate copolymers in Examples 4 to 6 have very small birefringence and excellent molding flowability, so that the optical strain of optical lenses obtained therefrom by injection molding is small. Further, the optical lenses have high transparency and high refractive indices, and they are free of a decrease in molecular weight and a change in color hue after a wet heat test and have low water absorption, so that they are excellent as optical lenses.

In contrast, in the polymers of Comparative Examples 3 to 5, positive and negative inherent birefringences are not fully offset, so that optical lenses obtained from the above polymers have large optical strains. Further, since the polymer in Comparative Example 4 has a large molecular weight and a high melt viscosity, no sufficient resin could be placed in a mold, so that not any molded piece having an intended form could be obtained.

Examples 7-9 and Comparative Examples 6-8

Evaluations were carried out as follows.

(1) Specific viscosity: Polyester carbonate copolymer pellets obtained after completion of polymerization were dried at 120° C. for 4 hours, and 0.35 g of the pellets were dissolved in 50 cc of methylene chloride to prepare a solution as a measurement sample. In the measurement, the solution was measured for a time period taken to pass between the marker lines of an Oswald viscosity tube in a constant-temperature chamber at 20±0.01° C., and the specific viscosity ($\eta_{sp}$) of the solution at 20° C. was determined on the basis of the following expression.

$$\eta_{sp}=(t_1-t_0)/t_0$$

Figure 3:
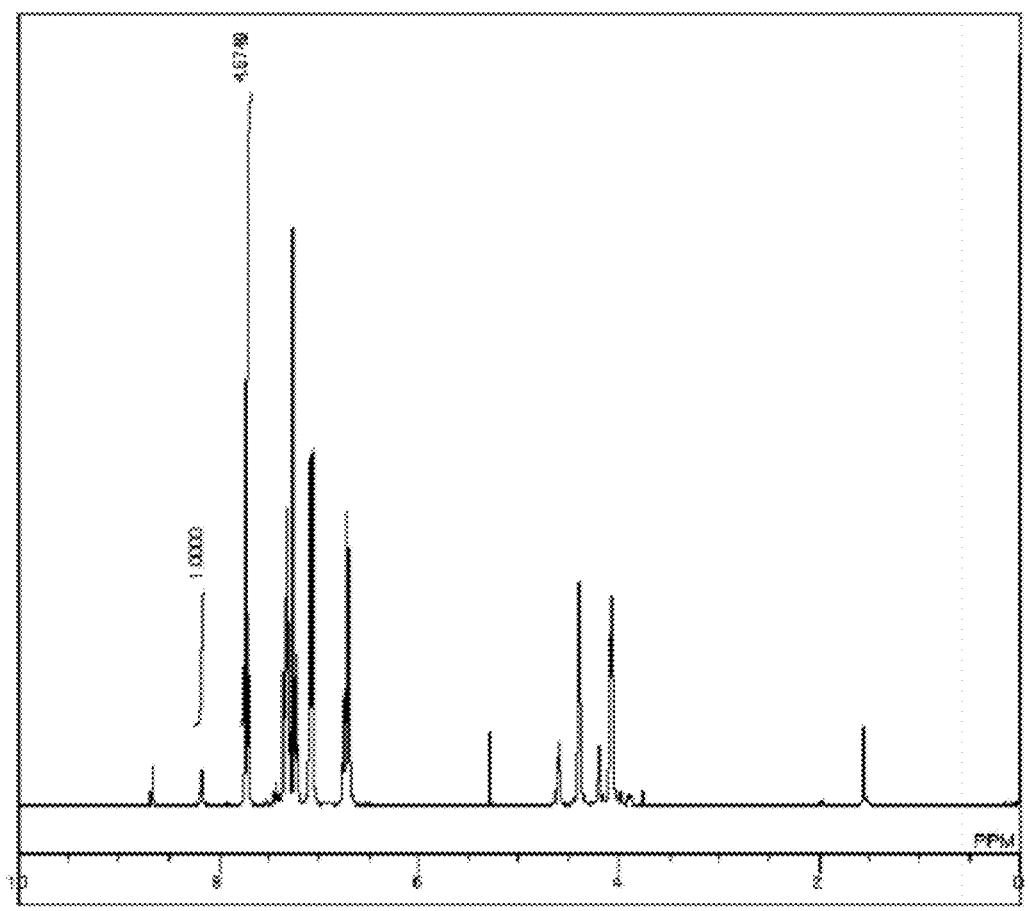
FIG. 3 is the proton NMR of a polyester carbonate copolymer obtained in Example 8.

$t_1$: Time period for the polymer solution taken to pass between the marker lines $t_0$: Time period for methylene chloride taken to pass between the marker lines (2) Copolymerization ratio: Measured by using proton NMR of JNM-AL400 supplied by JEOL Ltd. It was determined from an integral ratio of peaks derived from 9,9-bis(4-(2-hydroxyethoxy)phenyl)fluorene at 7.65 to 7.85 ppm and peaks derived from isophthalic acid at 8.06 to 8.40 ppm as shown in FIG. 3.

(3) Glass transition temperature (Tg): Polyester carbonate copolymer pellets obtained after completion of polymerization were measured with DSC model 910 supplied by Du Pont de Nemours Co., Ltd. at a temperature elevation rate of 20° C./minute.

(4) 4) Melt viscosity: Polyester carbonate copolymer pellets obtained after completion of polymerization were dried at 120° C. for 4 hours and measured for a melt viscosity at 280° C. at a shear rate of 1,000/second with a Capirograph 1D supplied by Toyo Seiki Seisaku-sho, Ltd.

(5) Refractive index ($n_d$) and Abbe's number (ν): A 0.1 mm thick disc was measured for a refractive index (wavelength: 589 nm) at 25° C. and an Abbe's number using 1-bromonaphthalene as an intermediate liquid with an Abbe refractometer DR-M2 supplied by ATAGO.

(6) Orientation birefringence (Δn): A 100 thick μm cast film was cut in the casting direction to have a length of 7 cm and cut in the direction (width direction) crossed at right angles with the casting direction to have a width of 1.5 cm, and the both ends of the cut piece in the longitudinal direction were pinched with chucks (inter-chuck distance 4.5 cm). The cut piece was stretched twice at Tg+10° C. of the polyester carbonate resin and measured for a retardation (Re) at 589 nm with an ellipsometer M-220 supplied by JASCO Corporation, and an orientation birefringence (Δn) was determined on the basis of the following expression.

$$\Delta n = Re/d$$

Δn: Orientation birefringence
Re: Retardation
d: Thickness (7) Optical strain: A molded lens was sandwiched between two polarizing plates, and light leakage from behind was visually observed under crossed Nicols to evaluate an optical strain. The evaluation was made on the basis of the following ratings.

⊚: Almost no light leakage is observed.
○: Slight light leakage is observed.
Δ: Light leakage is observed
X: Notable light leakage is observed.

(8) Resistance to wet heat: A 1 mm thick molded piece was left under conditions of 85° C. and 85% RH for 400 hours, and then its appearance was visually evaluated. Further, 0.7 g of the above molded piece was dissolved in 100 ml of methylene chloride, and the resultant solution was measured for a specific viscosity ($\eta_{sp}$) at 20° C., to determine a specific viscosity holding ratio (molecular weight holding ratio) after the wet heat test.

$$\Delta\eta_{sp} = (\eta_{sp1}/\eta_{sp0}) \times 100$$

$\Delta\eta_{sp}$: Specific viscosity holding ratio
$\eta_{sp0}$: Specific viscosity before test
$\eta_{sp1}$: Specific viscosity after test Example 7

157.86 Parts by weight of 9,9-bis(4-(2-hydroxyethoxy)phenyl)fluorene (BPEF), 7.77 parts by weight of dimethyl isophthalate (to be sometimes abbreviated as "IPAM" hereinafter), 71.98 parts by weight of diphenyl carbonate (DPC) and $20.42 \times 10^{-3}$ part by weight of titanium tetrabutoxide were placed in a reaction vessel equipped with a stirrer and a distillation apparatus, and under a nitrogen atmosphere and atmospheric pressure, they were heated to 180° C. and stirred for 20 minutes. Then, the reduced pressure degree was adjusted to 40 kPa over 20 minutes, and they were raised up to 250° C. at a rate of 60° C./hour to carry out an ester-exchange reaction. Then, while the temperature was maintaining at 250° C., the pressure was reduced to 0.13 kPa over 120 minutes, and a polymerizing reaction was carried out with stirring under conditions of 250° C. and 0.13 kPa or lower for 1 hour. Then, a formed polyester carbonate copolymer was withdrawn with pelletizing it. The above polyester carbonate copolymer had a BPEF to isophthalic acid (IPA) molar ratio of 90:10, a specific viscosity of 0.192, a Tg of 146° C. and a melt viscosity of 88 Pa·s.

The thus-obtained polymer was vacuum-dried at 120° C. for 4 hours, and based on a resin composition to be obtained, 0.050% of bis(2,4-dicumylphenyl)pentaerythritol diphosphite and 0.10% of pentaerythritol tetrastearate were added, followed by pelletization with a vented φ30 mm single-screw extruder.

(Cast Film)

The above pellets were dissolved in methylene chloride, then, cast on a glass dish and dried to give a 100 μm thick cast film. Table 3 shows the result of its measurement for orientation birefringence (Δn).

(Disc)

A 0.1 mm thick φ30 mm disc was injection-molded with an injection molding machine SE30DU supplied by Sumitomo Heavy Industries, Ltd. at a cylinder temperature of 270° C. and a mold temperature of 140° C. Table 3 shows the results of its measurements for a refractive index ($n_d$) and an Abbe's number (v).

(Lens)

A lens having a thickness of 0.3 mm, a convex surface curvature radius of 5 mm, a concave surface curvature radius of 4 mm and a diameter of φ5 mm was injection-molded with an injection molding machine SE30DU supplied by Sumitomo Heavy Industries, Ltd. at a cylinder temperature of 270° C. and a mold temperature of 140° C. Table 3 shows the result of its evaluation for an optical strain.

(Plate)

A plate having a thickness of 1 mm, a width of 2.5 cm and a length of 5 cm was injection-molded with an injection molding machine SE30DU supplied by Sumitomo Heavy Industries, Ltd. at a cylinder temperature of 270° C. and a mold temperature of 140° C. The thus-obtained molded piece had a $\Delta\eta_{sp}$ holding ratio (molecular weight holding ratio) of 100% after a wet heat test, and it also had no change in appearance.

Example 8

A polyester carbonate copolymer was synthesized in the same manner as in Example 7 except that the amount of BPEF was changed to 140.32 parts by weight, that the amount of IPAM was changed to 15.54 parts by weight and that the amount of DPC was changed to 54.84 parts by weight. The above polyester carbonate copolymer had a BPEF to IPA molar ratio of 80:20, a specific viscosity of 0.180, a Tg of 145° C. and a melt viscosity of 96 Pa·s.

A cast film, a disc, a lens and a plate were obtained in the same manner as in Example 7. Table 3 shows the results of evaluations of them for an orientation birefringence (Δn), a refractive index ($n_d$), an Abbe's number (v) and an optical strain. The obtained plate had a $\Delta\eta_{sp}$ holding ratio of 99% after a wet heat test, and it had no change in color hue.

Example 9

A polyester carbonate copolymer was synthesized in the same manner as in Example 7 except that the amount of BPEF was changed to 131.55 parts by weight, that the amount of IPAM was changed to 19.42 parts by weight and that the amount of DPC was changed to 46.27 parts by weight. The above polyester carbonate copolymer had a BPEF to IPA molar ratio of 75:25, a specific viscosity of 0.190, a Tg of 146° C. and a melt viscosity of 155 Pa·s.

A cast film, a disc, a lens and a plate were obtained in the same manner as in Example 7. Table 3 shows the results of evaluations of them for an orientation birefringence (Δn), a refractive index ($n_d$), an Abbe's number (v) and an optical strain. The obtained plate had a $\Delta\eta_{sp}$ holding ratio of 100% after a wet heat test, and it had no change in color hue.

Comparative Example 6

A polyester carbonate copolymer was synthesized in the same manner as in Example 7 except that the amount of BPEF was changed to 122.78 parts by weight, that the amount of IPAM was changed to 23.30 parts by weight and that the amount of DPC was changed to 35.99 parts by weight. The above polyester carbonate copolymer had a BPEF to IPA molar ratio of 70:30, a specific viscosity of 0.201, a Tg of 146° C. and a melt viscosity of 252 Pa·s.

A cast film, a disc, a lens and a plate were obtained in the same manner as in Example 7. Table 3 shows the results of evaluations of them for an orientation birefringence (Δn), a refractive index ($n_d$), an Abbe's number (ν) and an optical strain. The obtained plate had a $\Delta\eta_{sp}$ holding ratio of 97% after a wet heat test, and it had no change in color hue.

Comparative Example 7

A reactor with a thermometer, a stirrer and a dropping funnel was charged with 38 parts of pyridine and 360 parts of methylene chloride, and 48.4 parts of 9,9-bsi[4-(2-hydroxy-ethoxy)phenyl]fluorene was dissolved therein. While they were stirring, 9.6 parts of phosgene was blown thereinto at 15 to 25° C. over 25 minutes. At the same time, a solution of 10.4 parts of terephthalic acid chloride (30 mol % based on the total molar amount of the diol and aromatic dicarboxylic acid components) and 0.54 part of p-tert-butylphenol were dissolved and dropwise added in 100 parts of methylene chloride. After completion of the blowing introduction of the phosgene, they were stirred at 28 to 33° C. for 1 hour to complete the reaction. After completion of the reaction, the reaction product was diluted with methylene chloride and then washed with water, and then it was rendered acidic with hydrochloric acid and washed with water. When the conductivity of an aqueous phase became almost equal to that of ion-exchanged water, methylene chloride was volatilized to give 55.3 parts (yield 95%) of colorless polyester carbonate. This polymer had an ester group amount ratio of 30 mol %, a specific viscosity of 0.381, a glass transition temperature of 162° C. and a melt viscosity of 630 Pa·s.

A cast film, a disc, a lens and a plate were obtained in the same manner as in Example 7. Table 3 shows the results of measurements of them for an orientation birefringence (Δn), a refractive index ($n_d$), an Abbe's number (ν) and an optical strain. The obtained plate had a $\Delta\eta_{sp}$ holding ratio of 90% after a wet heat test, and it was colored in yellowish brown.

Comparative Example 8

A reactor equipped with a stirrer and a distillation apparatus was charged with 175.40 parts by weight of BPEF, 87.40 parts by weight of DPC, $1.60\times10^{-5}$ part by weight of sodium hydroxide and $3.65\times10^{-3}$ part by weight of tetramethylammonium hydroxide, and under a nitrogen atmosphere and atmospheric pressure, they were heated to 180° C. and stirred for 20 minutes. Then, the reduced pressure degree was adjusted to 20 to 30 kPa over 20 minutes, and they were raised up to 250° C. at a rate of 60° C./hour to carry out an ester-exchange reaction. Then, while the temperature was maintained at 250° C., the pressure was decreased to 0.13 kPa or less over 120 minutes, and under conditions of 250° C. and 0.13 kPa or lower, a polymerizing reaction was carried out with stirring for 1 hour. After completion of the reaction, nitrogen was blown into the reactor, and then $4.67\times10^{-4}$ part by weight of tetrabutylphosphonium dodecylbenzenesulfonate was added to increase the pressure so as to deactivate the catalyst. Then, the generated polycarbonate resin was withdrawn with pelletizing it, to give a BPEF homopolymer. The thus-obtained polymer had a specific viscosity of 0.200, a Tg of 145° C. and a melt viscosity of 81 Pa·s.

A cast film, a disc, a lens and a plate were obtained in the same manner as in Example 7. Table 3 shows the results of evaluations of them for an orientation birefringence (Δn), a refractive index ($n_d$), an Abbe's number (ν) and an optical strain. The obtained molded piece had a $\Delta\eta_{sp}$ holding ratio of 99% after a wet heat test, and it had no change in color hue.

It was found on the basis of IR measurement that the polymers obtained in Examples 7 to 9 had an absorption derived from a carbonate bond around 1,750 cm$^{-1}$ and an absorption derived from ester bond around 1,740 cm$^{-1}$. Further, it was found that they were random copolymers since they had one peak derived from a Tg obtained by DSC measurement. The proton NMR in FIG. 3 showed that the polymer obtained in Example 8 was a polyester carbonate copolymer of BPEF and IPA.

TABLE 3

| | Compositional ratio of raw materials | | | Compositional ratio of copolymer | | Evaluation Results | | | |
|---|---|---|---|---|---|---|---|---|---|
| | BPEF mol % | IPA mol % | TPA mol % | Formula (I) mol % | Formula (II) mol % | SV:*1 — | Tg ° C. | Δn ×10$^{-3}$ | MV*2 Pa·s |
| Ex. 7 | 90 | 10 | — | 89 | 11 | 0.192 | 146 | 0.63 | 88 |
| Ex. 8 | 80 | 20 | — | 75 | 25 | 0.180 | 145 | 0.59 | 96 |
| Ex. 9 | 75 | 25 | — | 67 | 33 | 0.190 | 146 | 3.1 | 155 |
| CEx. 6 | 70 | 30 | — | 57 | 43 | 0.201 | 146 | >4 | 252 |
| CEx. 7 | 70 | — | 30 | 57 | 43 | 0.381 | 162 | >4 | 630 |
| CEx. 8 | 100 | — | — | 100 | 0 | 0.200 | 145 | >4 | 81 |

| | Molding conditions | | Optical measurement results | | |
|---|---|---|---|---|---|
| | Cylinder temperature ° C. | Mold temperature ° C. | Refractive index ($n_d$) — | Abbe's number (ν) — | Optical strain — |
| Ex. 7 | 270 | 140 | 1.638 | 23 | ○ |
| Ex. 8 | 270 | 140 | 1.638 | 23 | ◎ |
| Ex. 9 | 270 | 140 | 1.639 | 23 | ○ |

TABLE 3-continued

| CEx. 6 | 270 | 140 | 1.640 | 23 | Δ |
| CEx. 7 | 270 | 140 | 1.640 | 23 | X |
| CEx. 8 | 270 | 140 | 1.635 | 24 | X |

Ex.: Example
CEx.: Comparative Example
SV*1 = Specific viscosity
MV*2 = Melt viscosity
BPEF: 9,9-bis(4-(2-hydroxyethoxy)phenyl)fluorine component
IPA: Isophthalic acid component
TPA: Terephthalic acid component The polyester carbonate copolymers in Examples 7 to 9 have very small birefringence and have excellent molding flowability, so that the optical strain of optical lenses obtained therefrom by injection molding is small. Further, the optical lenses have high refractive indices, and they are free of a decrease in molecular weight and a change in color hue after a wet heat test, so that they are excellent as optical lenses.

In contrast, in the polymers in Comparative Examples 6 to 8, positive and negative inherent birefringences are not fully offset, so that optical lenses obtained from the above polymers have large optical strains. Further, the polymer in Comparative Example 7 has a specific viscosity that is as large as 0.381, and hence has a high melt viscosity, so that the optical strain of the optical lens obtained from the a polymer is large.

Examples 10-13 and Comparative Examples 9-11

Evaluations were carried out according to the following methods.

(1) Copolymerization ratio: Determined on the basis of an integral ratio of peaks derived from components, using proton NMR of JNM-AL400 supplied by JEOL Ltd. 9,9-bis(4-(2-hydroxyethoxy)phenyl)fluorene and 9,9-bis(4-(3-hydroxyneopentoxy)phenyl)fluorene components: 7.7 ppm, naphthalenedicarboxylic acid component: 8.6 ppm, terephthalic acid component: 8.1 ppm, isophthalic acid component: 7.9 ppm, bisphenol A component: 1.6 ppm (2) Residual phenol amount: HPLC analysis using a gradient program was conducted with Develosil ODS-7 column supplied by Nomura Chemical Co., Ltd. using a mixture of eluant acetonitrile/0.2% acetic acid aqueous solution and acetonitrile at a column temperature of 30° C. and a detector of 277 nm. The measurement was carried out by dissolving 1.5 g of polyester carbonate copolymer pellets in 15 ml of methylene chloride, then adding 135 ml of acetonitrile, stirring the mixture, concentrating it with an evaporator, filtering it with a 0.2 μm filter and injecting 10 μl of this measurement solution. A quotient obtained by dividing the obtained phenol amount with the weight of a polymer used for the measurement was taken as a residual phenol amount.

(3) b value of pellets: Polyester carbonate copolymer pellets (a length of about 4 mm and a diameter of about 1-2 mm) obtained after completion of polymerization were placed in a glass cell, and measured for a color hue with a color difference meter SE-2000 supplied by Nippon Denshoku Industry Co., Ltd.

(4) Specific viscosity: Polyester carbonate copolymer pellets obtained after completion of polymerization were dried at 120° C. for 4 hours, and 0.35 g of the pellets were dissolved in 50 cc of methylene chloride to prepare a solution as a measurement sample. In the measurement, the solution was measured for a time period taken to pass between the marker lines of an Oswald viscosity tube in a constant-temperature chamber at 20±0.01° C., and the specific viscosity ($\eta_{sp}$) of the solution at 20° C. was determined on the basis of the following expression.

$\eta_{sp}=(t_1-t_0)/t_0$ $t_1$: Time period the polymer solution taken to pass between the marker lines $t_0$: Time period methylene chloride taken to pass between the marker lines Example 10

Step 1

30.00 Kilograms of 9,9-bis(4-(2-hydroxyethoxy)phenyl)fluorene (BPEF), 1.86 kg of dimethyl 2,6-naphthalenedicarboxylate (NDCM), 13.68 kg of diphenyl carbonate (DPC), 3 mg of sodium hydroxide and 0.7 g of tetramethylammonium hydroxide were introduced into a stirring vessel (first vessel) with a rectifying column. Then, the atmosphere inside was replaced with nitrogen 3 times, and then a jacket was heated to 180° C. to melt the raw materials.

Step 2

After they were fully melted, the pressure was reduced to 40 kPa over 20 minutes, and at the same time, the jacket was raised up to 260° C. at a rate of 60° C./hour to carry out an ester-exchange reaction. When the distillation amount of by-produced monohydroxy compounds reached 8 L (71% of a theoretical value), nitrogen was gradually charged therein to increase the pressure up to 0.15 MPa.

Step 3

Then, the prepolymer obtained was sent from the first vessel to a stirring vessel (second vessel) having no rectifying column.

Step 4

In the second vessel, while the jacket was maintaining at 260° C., the pressure was reduced to 40 kPa over 20 minutes and further reduced to 0.13 kPa over 100 minutes, and a polymerizing reaction was carried out under conditions of 260° C. and 0.13 kPa or lower for 30 minutes. After completion of the reaction, nitrogen was blown into the reactor to pressurize an atmosphere inside, and then $1.54 \times 10^{-4}$ parts by weight of tetrabutylphosphonium dodecylbenzenesulfonate was added to deactivate the catalyst. Then, the formed polyester carbonate copolymer was withdrawn with pelletizing it. Table 4 shows the evaluation results of the polyester carbonate copolymer.

Example 11

Step 1

30.00 Kilograms of BPEF, 3.32 kg of dimethyl terephthalate (DMT), 11.72 kg of DPC and 2.9 g of titanium tetrabutoxide were introduced into a stirring vessel (first vessel) with a rectifying column. Then, the atmosphere inside was replaced with nitrogen 3 times, and then a jacket was heated to 180° C. to melt the raw materials.

Step 2

After they were fully melted, the pressure was reduced to 80 kPa over 20 minutes, and at the same time, the jacket was raised up to 260° C. at a rate of 60° C./hour to carry out an ester-exchange reaction. When the distillation amount of by-produced monohydroxy compounds reached 7 L (67% of a theoretical value), nitrogen was gradually charged therein to increase the pressure up to 0.15 MPa.

Step 3

Then, the prepolymer was sent from the first vessel to a stirring vessel (second vessel) having no rectifying column.

Step 4

In the second vessel, while the jacket was maintaining at 260° C., the pressure was reduced to 40 kPa over 20 minutes and further reduced to 0.13 kPa over 100 minutes, and a polymerizing reaction was carried out under conditions of 260° C. and 0.13 kPa or lower for 30 minutes. After completion of the reaction, the formed polyester carbonate copolymer was withdrawn with pelletizing it. Table 4 shows the evaluation results of the polyester carbonate copolymer.

Example 12

Step 1

30.00 Kilograms of BPEF, 2.49 kg of DMT, 0.83 kg of dimethyl isophthalate (to be sometimes abbreviated as "DMI" hereinafter), 11.72 kg of DPC and 2.9 g of titanium tetrabutoxide were introduced into a stirring vessel (first vessel) with a rectifying column. Then, the atmosphere inside was replaced with nitrogen 3 times, and then a jacket was heated to 180° C. to melt the raw materials.

Step 2

After they were fully melted, the pressure was reduced to 80 kPa over 20 minutes, and at the same time, the jacket was raised up to 260° C. at a rate of 60° C./hour to carry out an ester-exchange reaction. When the distillation amount of by-produced monohydroxy compounds reached 7 L (67% of a theoretical value), nitrogen was gradually charged therein to increase the pressure up to 0.15 MPa.

Step 3

Then, the prepolymer was sent from the first vessel to a stirring vessel (second vessel) having no rectifying column.

Step 4

In the second vessel, while the jacket was maintaining at 260° C., the pressure was reduced to 40 kPa over 20 minutes and further reduced to 0.13 kPa over 100 minutes, and a polymerizing reaction was carried out under conditions of 260° C. and 0.13 kPa or lower for 30 minutes. After completion of the reaction, the formed polyester carbonate copolymer was withdrawn with pelletizing it. Table 4 shows the evaluation results of the polyester carbonate copolymer.

Example 13

Step 1

30.00 Kilograms of BPEF, 3.32 kg of DMT, 12.82 kg of DPC and 2.9 g of titanium tetrabutoxide were introduced into a stirring vessel (first vessel) with a rectifying column. Then, the atmosphere inside was replaced with nitrogen 3 times, and then a jacket was heated to 180° C. to melt the raw materials.

Step 2

After they were fully melted, the pressure was reduced to 80 kPa over 20 minutes, and at the same time, the jacket was raised up to 260° C. at a rate of 60° C./hour to carry out an ester-exchange reaction. When the distillation amount of by-produced monohydroxy compounds reached 7 L (67% of a theoretical value), nitrogen was gradually charged therein to increase the pressure up to 0.15 MPa.

Step 3

Then, the prepolymer was sent from the first vessel to a stirring vessel (second vessel) having no rectifying column.

Step 4

In the second vessel, while the jacket was maintaining at 260° C., the pressure was reduced to 40 kPa over 20 minutes and further reduced to 0.13 kPa over 100 minutes, and a polymerizing reaction was carried out under conditions of 260° C. and 0.13 kPa or lower for 30 minutes. After completion of the reaction, the formed polyester carbonate copolymer was withdrawn with pelletizing it.

Comparative Example 9

15.00 Kilograms of bisphenol A (to be sometimes abbreviated as "BPA" hereinafter), 3.19 kg of DMT, 11.27 kg of DPC and 2.8 g of titanium tetrabutoxide were introduced into a stirring vessel (first vessel) with a rectifying column.

Then, the atmosphere inside was replaced with nitrogen 3 times, and then a jacket was heated to 180° C. to melt the raw materials. After they were fully melted, the pressure was reduced to 80 kPa over 20 minutes, and at the same time, the jacket was raised up to 260° C. at a rate of 60° C./hour to carry out an ester-exchange reaction. When the distillation amount of by-produced monohydroxy compounds reached 7 L (70% of a theoretical value), nitrogen was gradually charged therein to increase the pressure up to 0.15 MPa.

Then, the prepolymer was sent from the first vessel to a stirring vessel (second vessel) having no rectifying column.

In the second vessel, while the jacket was maintaining at 260° C., the pressure was reduced to 40 kPa over 20 minutes and further reduced to 0.13 kPa over 100 minutes, and a polymerizing reaction was carried out under conditions of 260° C. and 0.13 kPa or lower for 30 minutes. After completion of the reaction, the formed polyester carbonate copolymer was withdrawn with pelletizing it. Table 4 shows the evaluation results of the polyester carbonate copolymer.

Comparative Example 10

Step 1

30.00 Kilograms of BPEF, 5.69 kg of DMT, 9.00 kg of DPC and 3.3 g of titanium tetrabutoxide were introduced into a stirring vessel (first vessel) with a rectifying column. Then, the atmosphere inside was replaced with nitrogen 3 times, and then a jacket was heated to 180° C. to melt the raw materials.

Step 2

After they were fully melted, the jacket was raised up to 260° C. at a rate of 60° C./hour under atmospheric pressure to carry out an ester-exchange reaction. The distillation came to an end when the amount of by-produced monohydroxy compounds reached 3 L (29% of a theoretical value). Nitrogen was gradually charged therein to increase the pressure up to 0.15 MPa.

Step 3

Then, the prepolymer was sent from the first vessel to a stirring vessel (second vessel) having no rectifying column.

Step 4

In the second vessel, while the jacket was maintaining at 260° C., the pressure was reduced to 40 kPa over 20 minutes and further reduced to 0.13 kPa over 100 minutes, and a polymerizing reaction was carried out under conditions of 260° C. and 0.13 kPa or lower for 60 minutes. After completion of the reaction, the formed polyester carbonate copolymer was withdrawn with pelletizing it. The thus-obtained pellets were colored in yellowish brown. Table 4 shows the evaluation results of the polyester carbonate copolymer.

Comparative Example 11

Step 1

30.00 Kilograms of BPEF, 14.66 kg of DMT, 9.00 kg of DPC and 3.3 g of titanium tetrabutoxide were introduced into a stirring vessel (first vessel) with a rectifying column. Then, the atmosphere inside was replaced with nitrogen 3 times, and then a jacket was heated to 180° C. to melt the raw materials.

Step 2

After they were fully melted, the pressure was reduced to 5 kPa over 20 minutes, and at the same time the jacket was raised up to 260° C. at a rate of 60° C./hour to carry out an ester-exchange reaction. Even when the reaction mixture was left for 1 hour after completion of the increasing of the temperature, only 3 L (30% of a theoretical value) of by-produced monohydroxy compounds were distilled, so that the reaction was terminated, and nitrogen was gradually charged therein to increase the pressure up to 0.15 MPa.

Step 3

Then, the prepolymer was sent from the first vessel to a stirring vessel (second vessel) having no rectifying column.

Step 4

In the second vessel, while the jacket was maintaining at 260° C., the pressure was reduced to 5 kPa over 20 minutes and further reduced to 0.13 kPa over 100 minutes, and a polymerizing reaction was carried out under conditions of 260° C. and 0.13 kPa or lower for 30 minutes. After completion of the reaction, the formed polyester carbonate copolymer was withdrawn with pelletizing it. Table 4 shows the evaluation results of the polyester carbonate copolymer.

TABLE 4

| | Polymerization conditions | | Compositional ratio of raw materials | | | | | | Compositional ratio of copolymer | | Evaluation results | | |
|---|---|---|---|---|---|---|---|---|---|---|---|---|---|
| | Initial reduced pressure kPa | DPC Molar ratio | BPEF mol % | BPPF mol % | BPA mol % | NDCM mol % | DMT mol % | DMI mol % | Formula (I) mol % | Formula (II) mol % | SV*1 | Amount of residual PhOH ppm | b value of pellets |
| Ex. 10 | 40 | 1.05 | 90 | — | — | — | 10 | — | 89 | 11 | 0.197 | 15 | 5.5 |
| Ex. 11 | 80 | 1.07 | 80 | — | — | — | 20 | — | 75 | 25 | 0.202 | 4 | 4.6 |
| Ex. 12 | 80 | 1.07 | 80 | — | — | — | 15 | 5 | 75 | 25 | 0.207 | 24 | 6.1 |
| Ex. 13 | 80 | 1.17 | 80 | — | — | — | 20 | — | 75 | 25 | 0.201 | 32 | 6.6 |
| CEx. 9 | 80 | 1.07 | — | — | 80 | — | 20 | — | 0 | 0 | 0.232 | 25 | 12.8 |
| CEx. 10 | none | 1.07 | 70 | — | — | — | 30 | — | 57 | 43 | 0.204 | 120 | 10.9 |
| CEx. 11 | none | 1.75 | 70 | — | — | — | 30 | — | 57 | 43 | 0.205 | 518 | 12.3 |

SV*1: Specific viscosity,
Ex. = Example,
CEx. = Comparative Example
*DPC (molar ratio) = {amount of DPC (mol)}/{diol component (mol) − dicarboxylic acid component (mol)}

Figure 4:
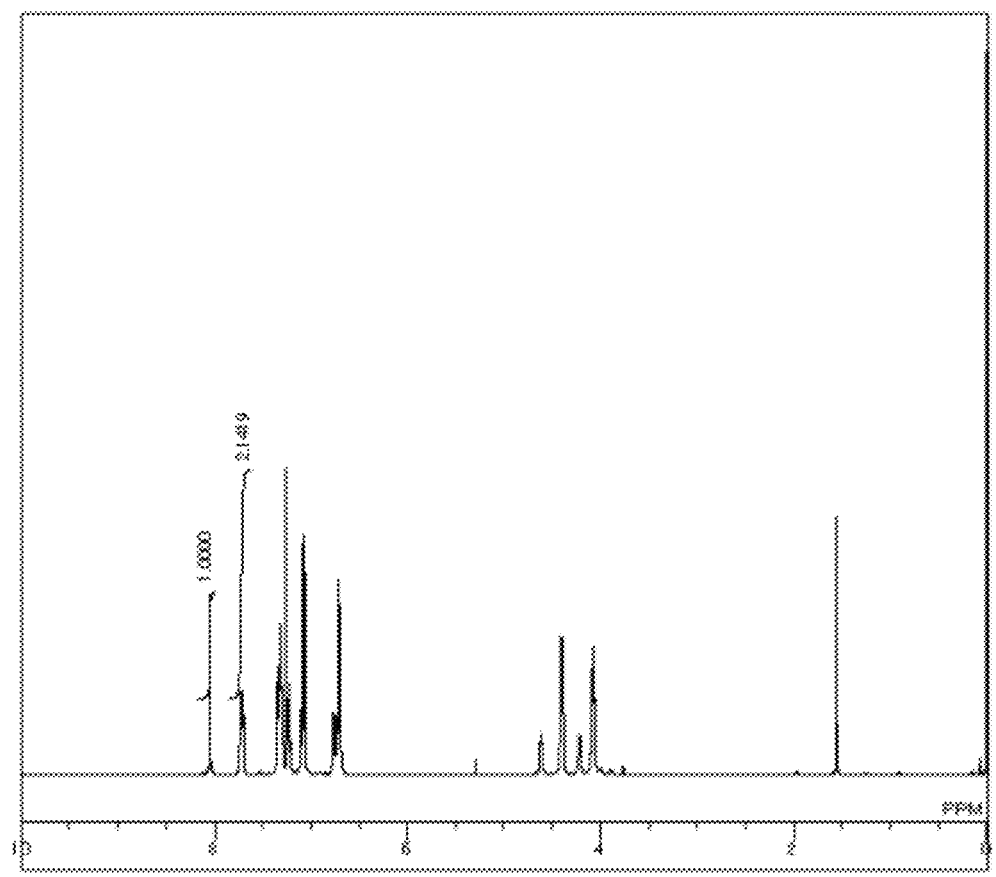
FIG. 4 is the proton NMR of a polyester carbonate copolymer obtained in Example 11.

Since the polyester carbonate copolymers obtained in Examples 10 to 13 have no aromatic hydroxy terminal group and have a very small amount of residual phenol, the copolymers obtained after polymerization are very excellent in color hue. In contrast, the polymer obtained in Comparative Example 9 contains an aromatic hydroxy terminal and is hence poor in color hue after polymerization. In the production process of Comparative Example 10, the reduced pressure degree at the initial stage of the polymerization is low, phenol is not distilled off, the polymerization takes a long time, so that the polymer obtained after the polymerization is poor in color hue. In the production process of Comparative Example 11, the amount of diphenyl carbonate charged is large, and the amount of residual phenol is large, so that a polymer obtained by the polymerization is inferior in color hue. The proton NMR of FIG. 4 shows that the polymer obtained in Example 11 is a polyester carbonate copolymer of BPEF and DMT.

EFFECT OF THE INVENTION

The polyester carbonate copolymer of this invention and an optical lens formed therefrom have high refractivity and transparency and low birefringence, and they have almost no optical strain. The polyester carbonate copolymer of this invention and an optical lens formed therefrom are also excellent in resistance to wet heat. According to the production process of this invention, a polyester carbonate copolymer having a phenol content of 1 to 100 ppm can be produced.

INDUSTRIAL APPLICABILITY

The copolymer of this invention and optical lenses formed therefrom can be used in fields where expensive high-refractivity glass lenses are conventionally used, for examples, various cameras such as digital video cameras, telescopes, binoculars, television projectors and prisms.

In particular, they are effective as camera lenses for thin compact lenses such as cellphones, digital camera lenses, on-vehicle camera lenses and web camera lenses.

The invention claimed is:

1. A polyester carbonate copolymer for an optical lens, which comprises 67 to 95 mol % of a unit of the following formula (I) and 33 to 5 mol % of a unit of the following formula (II) and has a specific viscosity of 0.12 to 0.30,

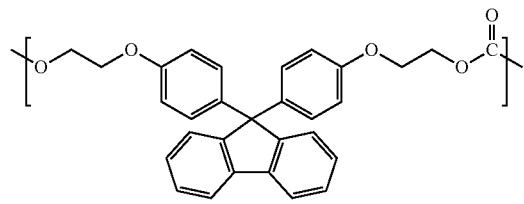

(I)

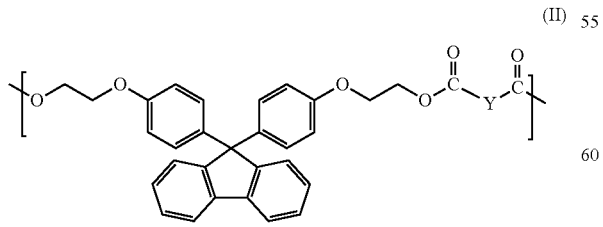

(II)

wherein Y in the formula (II) is a phenylene group or a naphthalenediyl group, and when Y in the formula (II) is a 2,6-naphthalenediyl group, the copolymer comprises 82 to 95 mol % of the unit of the formula (I) and 18 to 5 mol % of the unit of the formula (II), and when Y in the formula (II) is a 1,4-phenylene group or a 1,3-phenylene group, the copolymer comprises 75 to 82 mol % of the unit of the formula (I) and 25 to 18 mol % of the unit of the formula (II).

2. The copolymer of claim 1, which has a refractive index of 1.635 to 1.650.

3. The copolymer of claim 1, which has an orientation birefringence of 0 to $6 \times 10^{-3}$.

4. The copolymer of claim 1, which has a transmittance of 80% or more at a wavelength of 395 nm in the state of a molded plate having a thickness of 0.1 mm.

5. The copolymer of claim 1, which has a melt viscosity, measured at 280° C. and at a shear rate of 1,000/sec, of 30 to 300 Pa·s.

6. The copolymer of claim 1, which has a phenol content of 1 to 100 ppm.

7. An optical lens formed of the polyester carbonate copolymer recited in claim 1.

8. The optical lens of claim 7, which has a thickness of central portion of 0.05 to 3.0 mm and a diameter of 1.0 mm to 20.0 mm.

9. A process for producing a polyester carbonate copolymer for an optical lens as recited in claim 1, which comprises the steps of (i) melting 9,9-bis[4-(2-hydroxyethoxy)phenyl]fluorene, an aromatic dicarboxylic acid or an ester-forming derivative thereof and a carbonate diester in a first reaction vessel (step 1), (ii) reacting them in the first reaction vessel at a temperature of 120 to 300° C. under a reduced pressure of 20 to 90 kPa until the distillation amount of by-produced monohydroxy compounds reaches 50 to 90% of a theoretical distillation amount (step 2), (iii) transferring a reaction solution from the first reaction vessel to a second reaction vessel (step 3), and (iv) proceeding with the reaction in the second reaction vessel at a temperature of 150 to 320° C. until a final internal pressure comes to be 1 to 500 Pa (step 4).

10. The process of claim 9, wherein the first reaction vessel has a rectifying column.

11. The process of claim 9, wherein the amount (molar ratio) of the aromatic carbonate diester satisfies the following expression, $$1.0 \leq (C)/\{(A)-(B)\} \leq 1.5 \quad \text{(III)}$$

wherein (A) is an amount of 9,9-bis[4-(2-hydroxyethoxy)phenyl fluorene charged, (B) is an amount of an aromatic dicarboxylic acid or its ester-forming derivative charged, and (C) is an amount of an aromatic carbonate diester used.

* * * * *